(12) United States Patent
Colella et al.

(10) Patent No.: US 9,193,312 B2
(45) Date of Patent: Nov. 24, 2015

(54) OCCUPANT COMMUNICATION SYSTEM AND CONTROL METHOD

(71) Applicant: Ford Global Technologies, LLC, Dearborn, MI (US)

(72) Inventors: Nicholas Colella, Grosse Ile, MI (US); Cynthia M. Neubecker, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/185,232

(22) Filed: Feb. 20, 2014

(65) Prior Publication Data

US 2015/0232045 A1    Aug. 20, 2015

(51) Int. Cl.
*B60R 16/023* (2006.01)
*H04B 3/00* (2006.01)

(52) U.S. Cl.
CPC .................... *B60R 16/023* (2013.01)

(58) Field of Classification Search
CPC ........... B60R 16/023; H04B 3/00; H04B 5/00
USPC ................. 701/49, 36, 2; 381/77, 86
See application file for complete search history.

(56) References Cited

U.S. PATENT DOCUMENTS

| | | | |
|---|---|---|---|
| 5,661,811 A * | 8/1997 | Huemann et al. | 381/309 |
| 6,330,337 B1 * | 12/2001 | Nicholson et al. | 381/86 |
| 7,190,798 B2 * | 3/2007 | Yasuhara | 381/86 |
| 8,265,711 B2 * | 9/2012 | Shim | 455/569.2 |
| 8,391,775 B2 * | 3/2013 | Moinzadeh et al. | 455/3.06 |
| 2004/0130617 A1 | 7/2004 | Tseng | |
| 2007/0005206 A1 * | 1/2007 | Zhang et al. | 701/36 |
| 2010/0026892 A1 | 2/2010 | Thijssen | |

FOREIGN PATENT DOCUMENTS

| | | |
|---|---|---|
| CN | 201501361 U | 6/2010 |
| CN | 202916745 U | 5/2013 |

* cited by examiner

*Primary Examiner* — Tan Q Nguyen
(74) *Attorney, Agent, or Firm* — Burgess Law Office, PLLC; Raymond I. Coppiellie

(57) ABSTRACT

An occupant communication system (OCS) and control method giving rear row occupant experience and full control to allow unimpeded access to a vehicle's features typically provided to the front row occupants. The OCS having a rear zone master controller controlling a plurality of selected vehicle subsystems within the occupant communication system and a front zone controller in electrical communication with the rear zone master controller that is controlled by the rear zone master controller. A communications module communicates with the rear zone master controller and the front zone controller wherein the rear zone master controller, the front zone controller, and the communications module are in operative communication with one another and with a vehicle communications network via the communications module to control the plurality of selected vehicle subsystems such that the rear zone master controller enables, disables, or limits control of the front zone controller via the communications module.

20 Claims, 20 Drawing Sheets

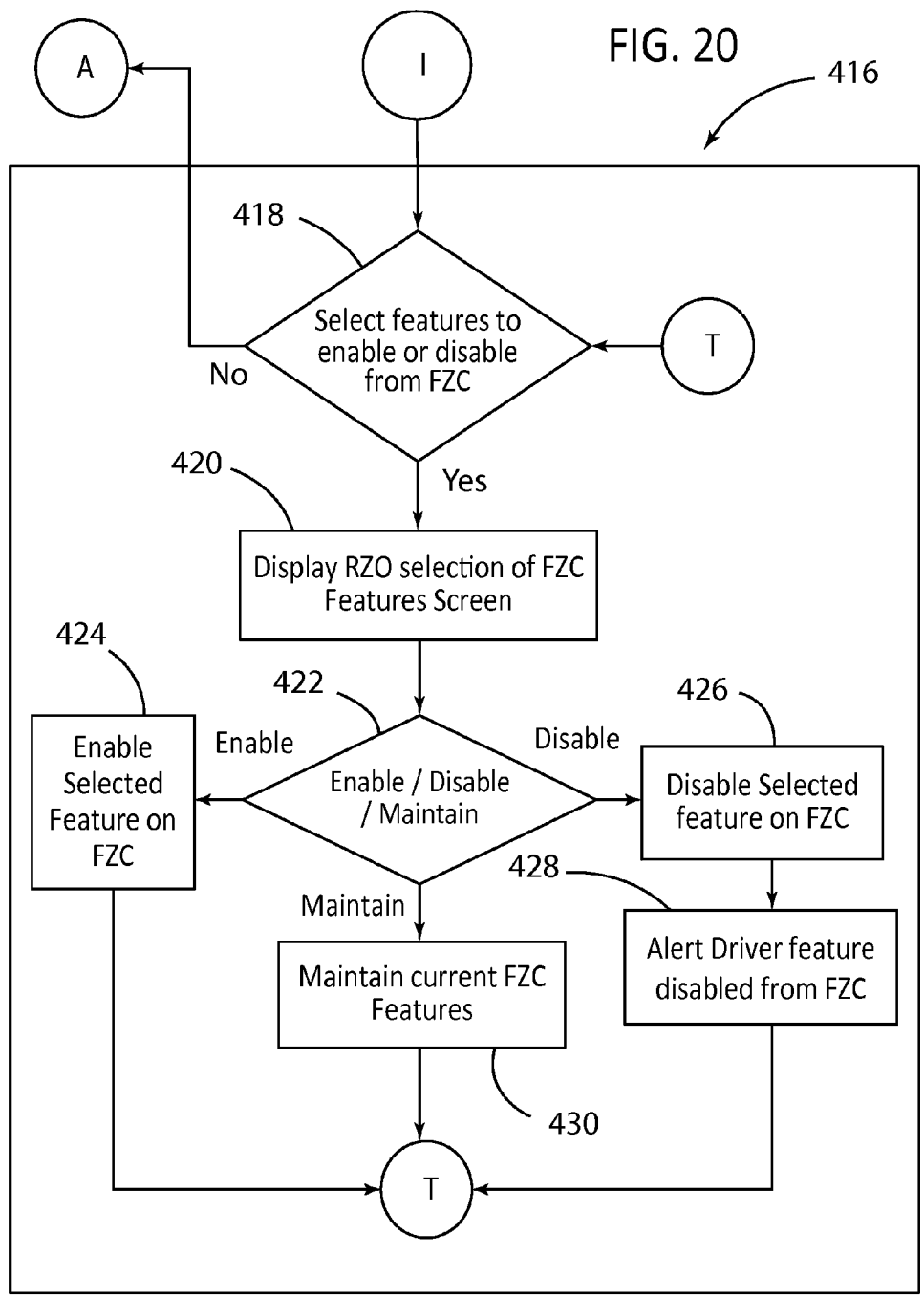

OCCUPANT COMMUNICATION SYSTEM AND CONTROL METHOD

CROSS-REFERENCE TO RELATED APPLICATIONS

Not Applicable.

BACKGROUND OF THE INVENTION

1. Field of the Invention

The present invention relates generally to vehicle settings and functions and, more particularly, enabling rear seat occupant control for certain vehicle settings.

2. Description of Related Art

Modern vehicles include innovative touch screen controls or customizable cluster screens enabling a vehicle operator to personalize their driving experience; including entertainment, climate controls, seat positions and other features. In addition, the vehicle may also include multiple touch screens and displays, including entertainment systems, located in the rear of the vehicle. These systems often pair with a phone enabling hands-free operation, offer and opportunity for access to the Internet, and provide a mechanism to provide entertainment to the occupant during transit.

The touchscreen controls are typically located adjacent the vehicle operator and are controlled by the vehicle operator. For example, the vehicle temperature, radio station selection, and other vehicle features are typically controlled by the vehicle operator or a front seat passenger having access to the touchscreen.

Accordingly, a person seated in the rear row of the vehicle loses the opportunity to have full control of vehicle features including such things as infotainment features, connectivity, social media, radio tuning, navigation, climate control, seat control, and other vehicle comforts. Further, there's a lack of privacy for rear seat or rear zone passengers using vehicle features or functions.

SUMMARY OF THE INVENTION

An occupant communication system (OCS) and control method giving a rear row or zone occupant the experience and full control to allow unimpeded access to a vehicle's features typically provided to the front row occupants. One example of the OCS includes: a rear zone master controller controlling a plurality of selected vehicle subsystems within the occupant communication system. The rear zone master controller controls a front zone controller in electrical communication with the rear zone master controller. A communications module enables communication between the rear zone master controller and the front zone controller. The rear zone master controller, the front zone controller, and the communications module are in operative communication with one another and with a vehicle communications network to control the plurality of selected vehicle subsystems, wherein the rear zone master controller enables, disables, or limits control of the front zone controller.

Further provided is the ability to authenticate a user and to pair an occupant communication device with the OCS. Additionally, the OCS is capable of operating in a privacy mode preventing the front row occupants from monitoring or displaying on a front zone controller any of the features accessed by the rear row occupant.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 20 illustrates a more detailed view of a feature enablement/disablement process within the rear zone occupant selection of front zone occupant features process shown in FIG. 11 in accordance with an embodiment of the invention.

DETAILED DESCRIPTION OF THE PREFERRED EMBODIMENTS

The following description of the preferred embodiment(s) is merely exemplary in nature and is in no way intended to limit the invention, its application, or uses.

The occupant communications system has one or more control modes targeted to the rear row or zone occupant experience and full control to access and refocus certain vehicle settings and infotainment functions to the rear row or zone occupant, and block the front row or zone control completely or limit the front row or zone control and display information to navigation, any driver only relevant information, or to any additional vehicle features specified by the rear zone occupant. Additionally, the rear zone occupant may select a privacy mode preventing a front zone controller from displaying any feature selections that the rear zone occupant selects to view in a rear zone of the vehicle.

The terminology employed herein is used for the purpose of describing particular embodiments or examples only and is not intended to be limiting since the scope of the present disclosure will be limited only by the appended claims and equivalents thereof. It must be noted that, as used in this specification and the appended claims, the terms front and rear are used herein solely for reference purposes and are not meant to limit the scope of the present invention. For example, "zone" as used herein may refer to a "driver" zone and a "passenger" zone, which may be located in a rear seat.

Figure 1:
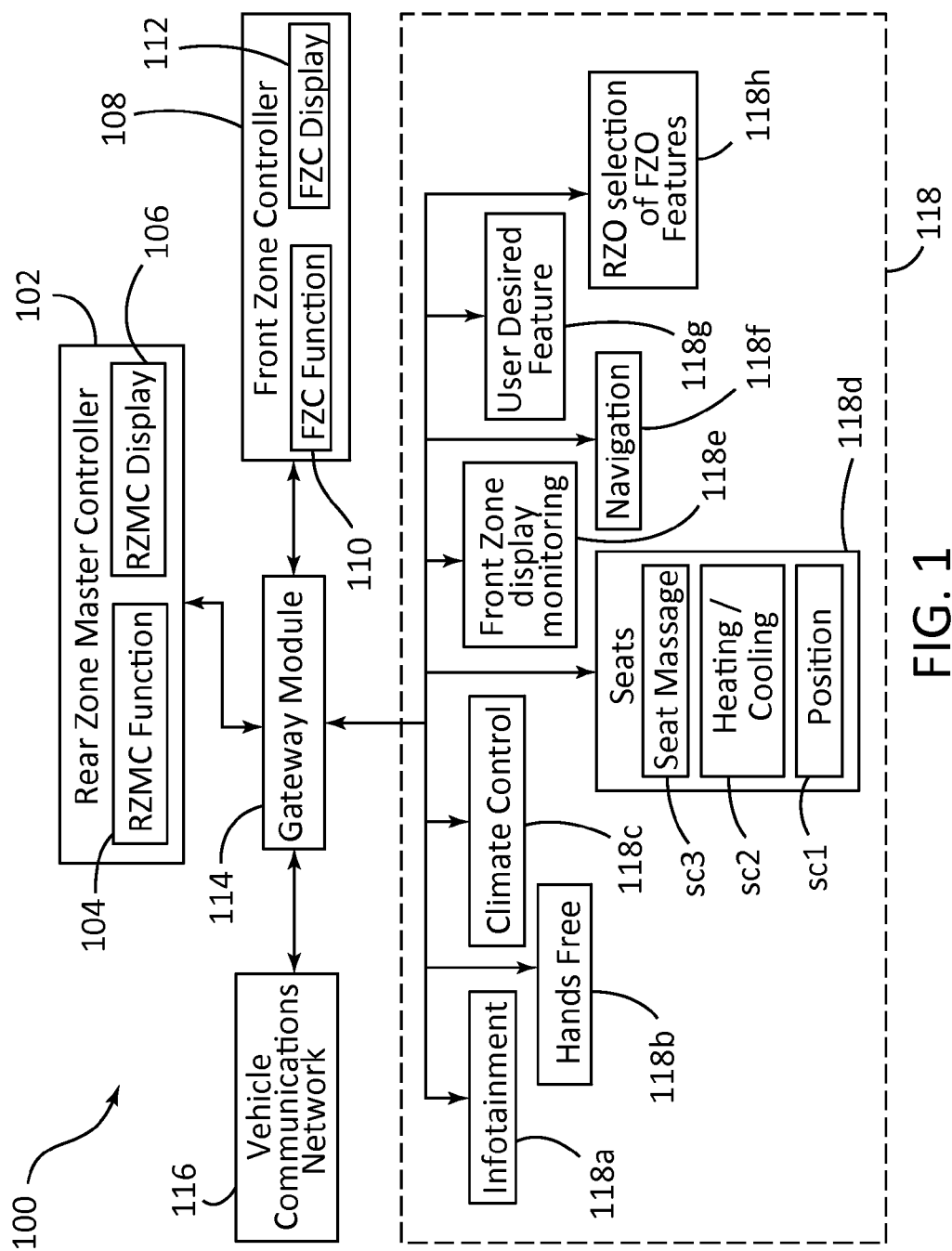
FIG. 1 illustrates a block system diagram of an occupant communication system in accordance with an embodiment of the invention.

FIG. 1 is a block system diagram of an example of an occupant communication system having one or more control modes providing an occupant seated in a rear row of a vehicle, i.e. a rear zone, control of subsystems or features typically only available to front row, i.e. front zone, occupants including the driver.

The rear zone occupant is able to take full control of vehicle features that are not essential to basic driving functions or operation of a moving vehicle such as infotainment services, hands free phone services, climate control features, seat features, front zone display monitoring, navigation and any other existing or future available vehicle functions that may come into existence.

In general, the rear zone occupant (e. g., a second or third row passenger) may be defined as the administrative user who has greater control over the functionality of the various non-driver and in some cases, driver-related functional features in the vehicle. For example, the identified rear occupant may enable or disable the non-driver related functional features in the vehicle. In some instances, the term rear zone occupant may also include a passenger or occupant in the front seat; typically, when the front zone controller limits viewing/access to a front seat passenger. For example, the front zone controller may be moved or repositioned preventing driver access. In addition, a second or multiple front zone controllers may be present in the vehicle wherein the front seat passenger has access to the one of the front zone controllers and can thereby limit access and control of the remaining front zone controller by the driver.

The driver or front row passenger may be defined as a front zone occupant whose control over the non-driver related functional features generally provided by the vehicle is subjected to functional restrictions imposed or selected by the administrative rear occupant. For example, the administrative rear occupant may enable/disable the non-driver related functional features for the driver, and the driver is not capable of enabling/disabling such features control by the administrative rear occupant. The rear zone controller is master controller thereby making a front zone controller a slave device restricted to limited functions; such controlling driver related features or functions only and only displaying driver-related information only features or functions selected by a rear zone occupant.

In one example, the OCS may be implemented as part of the SYNC® system developed by Ford Motor Company® and Microsoft®, SYNC® is a registered trademark of the Ford Motor Company, Dearborn, Mich.

FIG. 1 depicts one example of an occupant communication system (OCS) 100 including a rear zone master controller (RZMC) 102 that controls a plurality of selected vehicle subsystems 118 within the OCS 100. A front zone controller (FZC) 108 in electrical communication with the rear zone master controller 102 is controlled by the rear zone master controller 102. While referred to herein as a rear zone master controller (RZMC) 102 and a front zone controller (FZC) 108 the respective controllers may also be referred to and correlate with different zones of the vehicle interior for example a passenger zone master controller and a driver zone controller. Accordingly, the respective zones are not limited to a front or rear location or seat in the vehicle.

One example of a system for facilitating communications between the RZMC 102 and FZC 108 includes a communications module in communication with the rear zone master controller 102 and the front zone controller 108. The rear zone master controller 102, the front zone controller 108, and the communications module communicate with one another and with a vehicle communications network 116 via the communications module to control a plurality of selected vehicle subsystems 118. One example of the present invention includes the communications module being a gateway module 114; however, this is for the purpose of illustration only as the occupant communication system (OCS) 100 may operate without a gateway module.

The subsystems controlled by the RZMC include vehicle features that are not essential to or needed for the basic driving functions or safe operation of the vehicle. Essential or necessary vehicle features or functions required to drive or safely operate a moving vehicle include but are not limited to steering systems, braking systems, turn signals, headlights, and defrost.

Figure 2:
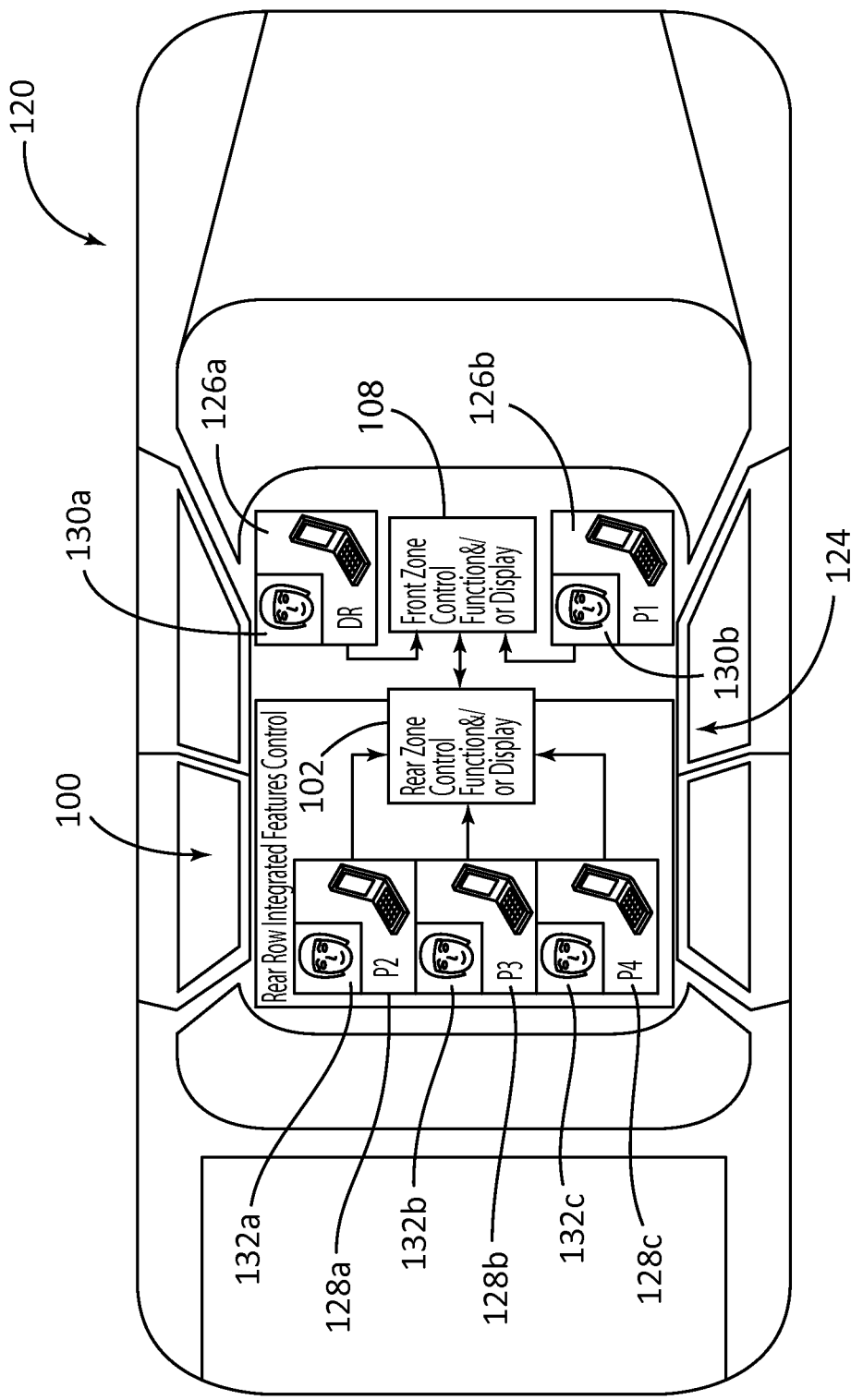
FIG. 2 illustrates the occupant communication system of FIG. 1 in a vehicle in accordance with an embodiment of the invention.

FIG. 2 depicts an embodiment of the invention including the OCS 100 within a vehicle 120 having a plurality of occupants including front zone occupants 130 (FZOs) and rear zone occupants 132 (RZOs). The FZOs include a driver DR, 130a and one or more passengers P1, 130b located in a front row, hereinafter referred to as a "Front Zone" (FZ) of the vehicle 120. The RZOs include one or more passengers P2, P3, P4, 132a-132c located in a rear row, which includes a first or any additional rear rows as determined by specific vehicle configurations, herein referred to as a "Rear Zone" (RZ) of the vehicle. In certain instances, the "Rear Zone" (RZ) of the vehicle may include the passenger portion of the front row; for example, when access to the OCS is limited to the passenger.

Referring now to FIGS. 1 and 2, the RZMC controls a plurality of vehicle functions within each vehicle subsystem 118 as determined by a RZO. The rear zone master controller 102 enables, disables, or limits control of the front zone controller 108 via the gateway module 114. The RZMC 102 includes a RZMC function controller 104 that controls the plurality of vehicle features and functions and a RZMC display 106 that provides an interface for a RZO to operate the RZMC 102.

The RZMC display may be a touch screen, for example, that detects contact and movement or breaks thereof using any of multiple touch sensitivity technologies, including but not limited to capacitive, resistive, infrared, and surface acoustic wave technologies, as well as other proximity sensor arrays or other elements for determining one or more points of contact with the touch screen.

The RZMC 102 may also interface with switches (not shown) positioned throughout the vehicle to enable touch selection control of the RZMC display 106 to perform a function with the OCS 100 so that the occupant does not have to physically contact switches to control the desired function or features.

Similarly, the FZC 108 includes a FZC function controller 110 that controls all available vehicle features and functions when the RZMC 102 is not enabled and controls none, all, or a selected plurality of vehicle features and functions via vehicle subsystems as determined by the control mode of the RZMC 102 when the RZMC is enabled. Further, the FZC 108 also includes a FZC display 112 that provides an interface for a FZO to operate the FZC 108.

Additionally, the RZO may desire that the FZO not view the features displayed on the RZMC display 106, and thus, the RZMC may be configured to operate in a privacy mode, thus preventing FZOs from viewing the RZMC display 106.

FIG. 2 shows a driver 130a and passenger 130b having an occupant communication device that may pair in synchronous communication with the FZC 108. Further, rear zone passengers 132a-132c also have communication devices that may be paired synchronous communication with the idea in the RZMC 102 or the FZC 108. An occupant communication device may be any data synchronizing device or other data processing devices, including but not limited to: a handheld computer, a personal digital assistant, a mobile telephone, a multimedia device, a navigation device, an email device, a game console, or a combination of any two or more of these data processing devices.

In an embodiment of the invention, the occupant communication devices (OCDs) (shown as 126a for the driver's OCD and 126b for the passenger devices in the front zone, and 128a, 128b, 128c for RZO) that may be paired with the OCS via the FZC 108 for the FZO and via the RZM 102 for the RZO. Additionally, the OCD may be authenticated with the RZMC.

Pairing may be accomplished using a wireless protocol such as Bluetooth®, 802.x communication protocols (e.g., 802.11b/g, WiMax, Wi-Fi, 3G), code division multiple access (CDMA), global system for mobile communications (GSM), Enhanced Data GSM Environment (EDGE), Network Operating Environment, or any other suitable wireless protocol that exists or may exists to connect the OCD to the RZMC 102. include one or more wireless communication subsystems, Such phone pairing can be accomplished using a communication system such as SYNC®, which is a registered trademark of the Ford Motor Company, Dearborn, Mich., and features such as voice command capability or any other capability provided by SYNC® could be used to control the RZMC.

In an embodiment of the invention, each OCD may also include a display that can display RZMC control features that a RZO may then perform a function with the OCD so that the occupant does not have to enter data via hard or soft buttons or switches located directly on the RZMC 102.

In an embodiment of the invention, a software update service that automatically determines whether software updates exist for software on the paired OCD, then downloads the software updates to the paired OCD where the software updates can be manually or automatically unpacked and/or installed.

Each controller 102, 108 may include a memory interface, one or more data processors, image processors and/or central processing units, and a peripherals interface. The memory interface, the one or more processors and/or the peripherals interface can be separate components or can be integrated in one or more integrated circuits. The foregoing description of a vehicle network is not limiting, and includes vehicle networks in general. For example, implementation of the OCS 100 could be done on any type of in-vehicle networking protocol; e.g., CAN, Ethernet, MOST, etc.

The various components in the rear zone master controller and the front zone controller can be coupled by one or more communication buses or signal lines or a wireless protocol to the vehicle communications network 116. Additionally, sensors, devices, and subsystems can be coupled to the RZMC 102 and the FZC 108 to facilitate multiple functionalities with the vehicle communications system 116.

The vehicle communications network 116 includes a vehicle Controller Area Network (CAN) that may be implemented as a High or Medium Speed CAN and is in operative communication with the RZMC 102, the FZC 108, and the plurality of vehicle subsystems 118 via the gateway module 114.

Each feature may provide additional features that function to enhance each feature. Each feature is further controlled by a subsystem 118a-118h as shown in FIG. 1 that is in operative communication with the RZMC 102 and with the FZC 108.

The subsystems 118 may include a plurality of fuses, relays, switches, and various controllers or micro-controllers for performing any number of functions related to the operation of interior and/or exterior electrically based subsystems of vehicle. The vehicle subsystems may include clients and servers that may be generally remote from each other and interact with each other and with the FZC 108 and the RZMC 102 through the vehicle communications network 116. The relationship of client and server arises by virtue of computer programs running on the respective computers and having a client-server relationship to each other.

Such subsystems may include, but are not limited to, an infotainment system 118a, a hands-free subsystem 118b, a climate control subsystem 118c, a seat control subsystem 118d, a Front Zone Display monitoring subsystem 118e, a Navigation subsystem 118f, a user defined feature subsystem 118g, and a RZO selection of FZO features subsystem or feature 118h.

In several embodiments of the invention depicted in FIGS. 5, 7, 8, 10 and 19, various screens are displayed on the RZMC display 106 to provide interactive control over the control mode and subsystems and related features controlled by the RZMC 102 when selected by a RZO. The display screens may include configurable graphical user interfaces (GUI).

Figure 5:
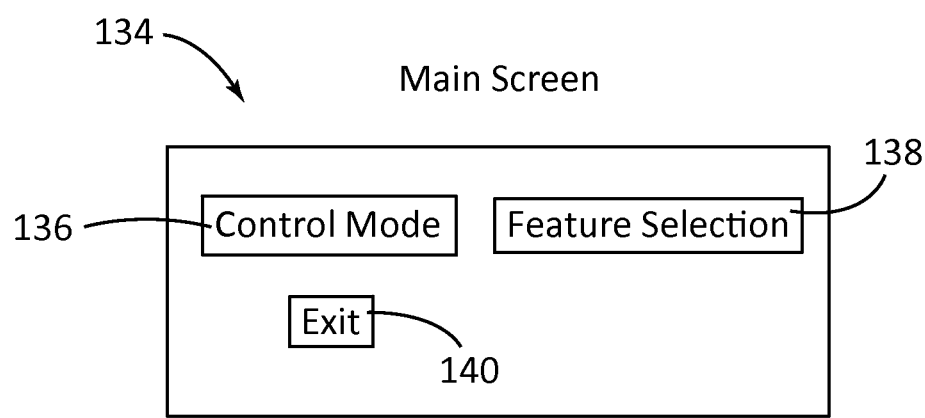
FIG. 5 illustrates a main screen displayed as a graphical user interface (GUI) on a rear zone master controller display device interface in accordance with an embodiment of the invention.

FIG. 5 depicts a graphical user interface (GUI) main screen display 134 that may be displayed upon enablement of the RZMC 102, the main screen display 134 having selections that include a control mode option 136 to select an OCS control mode to operate in which to control the vehicle features and a feature selection option 138 to select desired features to be controlled by the RZMC 102. An exit option 140 is provided that may be selected to disable the RZMC and exit the display.

Figure 7:
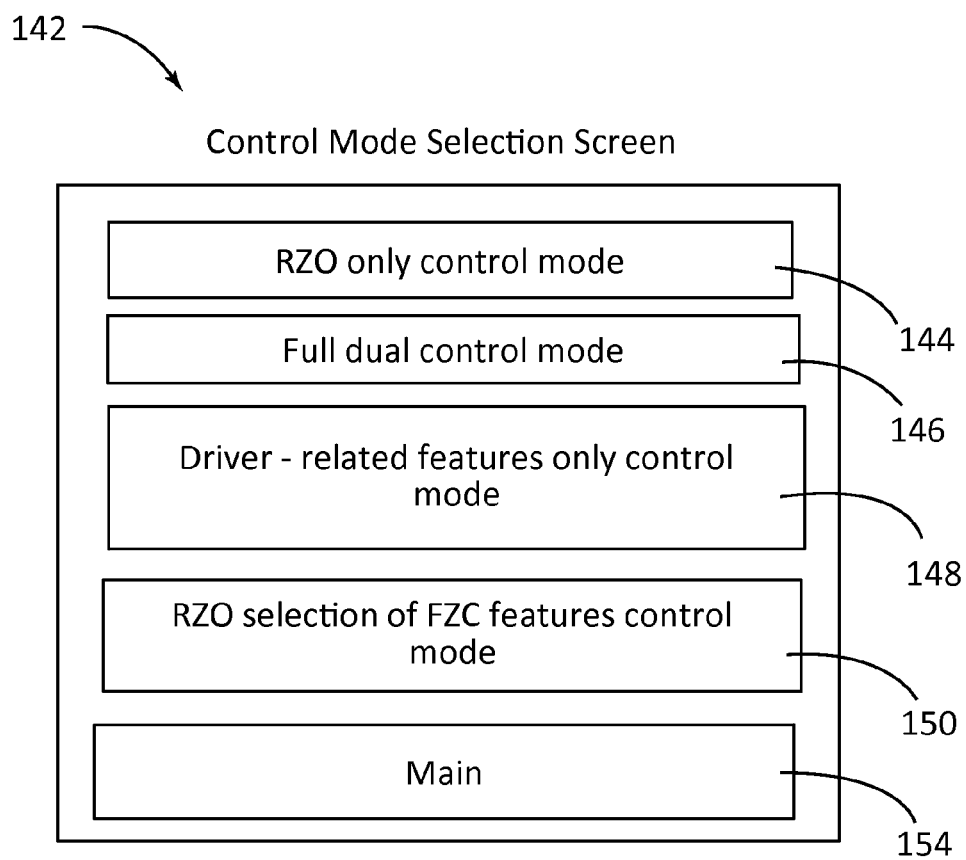
FIG. 7 illustrates a control mode selection screen displayed as a GUI on a rear zone master controller display device in accordance with an embodiment of the invention.

FIG. 7 depicts a control mode selection screen 142 that may also be displayed on the RZMC display 106 when the control mode option 136 is selected from the main screen display 134. While the RZMC 102 is enabled, the RZMC 102 maintains full functional control of all of the available vehicle features, except for controlling features related to controlling the basic operation of a moving vehicle and may also limit or prevent control of the FZC 108 over the vehicle features unless operating in a RZO control mode configured to override all functionality of the front zone controller as described in further detail below. Selection of the OCS control modes allow the RZO to select how much to limit or prevent control of the FZC over the vehicle features.

In operation, the RZMC 102 transmits a control mode alert signal warning to the front zone controller 108 to notify the driver of which control mode the OCS is operating. Additionally, the front zone controller 108 may warn the driver that certain subsystems or features are unavailable to the driver using any driver notification features that are known in the art. Each of the control mode alerts sent to the driver may be displayed on a portion of the FZC display 112 or alone on a special screen display of the FZC 112.

As shown in FIG. 7, the RZO only control mode is selected by choosing option 144 from the control mode selection screen 142 to completely block functional control that the FZC 108 has over any vehicle features including driving related features. For example, when in the RZO only control mode, the driver cannot start the vehicle if the RZO has disabled the FZC from such an operation.

In the RZO control mode, depending on region of sale or operational state of the vehicle, features normally blocked for driver related only are enabled for the RZO to control. While the FZC is disabled, the information regarding the enabled features controlled by the RZMC may still be displayed by the front zone controller display.

In another example of the invention, when operating in the RZO control mode, the RZO may control all available vehicle features in both the FZ and the RZ of the vehicle when the vehicle is not moving such as starting or turning-off the vehicle or controlling the headlights or other safety-related features. Further, when operating in the RZO control mode, for safety reasons, the RZO may be able to disable all functional control of the FZC even while the vehicle is operational and moving such as in a situation where a driver suddenly becomes incapacitated. Disabling all vehicle controls available to driver would allow safety systems to activate and provide a means for more safely allowing the vehicle to stop in such a dangerous situation. In a region where the RZO control mode is not permitted, the mode may be eliminated from the RZMC operation or may not be selectable as an option in the control mode selection screen.

The full dual control mode is selected by choosing option 146 from the control mode selection screen 142 to allow full functional control of the vehicle features by both the FZC 108 and the RZMC 102. A warning is displayed on the FZC display 112 to alert the driver that the OCS is operating in the full dual control mode.

The Driver-related features only control mode is selected by choosing option 148 from the control mode selection screen 142 to limit functional control that the FZC has over any vehicle features to driver-related features only and displaying driver-related information only, with the exception of preventing the driver to access any mandatory features that are government regulated or are necessary for vehicle-related safety and basic vehicle operation. The driver-related features only may optionally include navigation features. A warning is displayed on the FZC display 112 to alert the driver that the OCS is operating in the RZO selection of FZC features control mode.

The RZO selection of FZC features control mode is selected by choosing option 150 from the control mode selection screen 142 to limit functional control that the FZC has over any vehicle features to only those features selected by the RZO with the exception of preventing the driver to access any mandatory features that are government regulated or are necessary for vehicle-related safety and basic vehicle operation.

Figure 8:
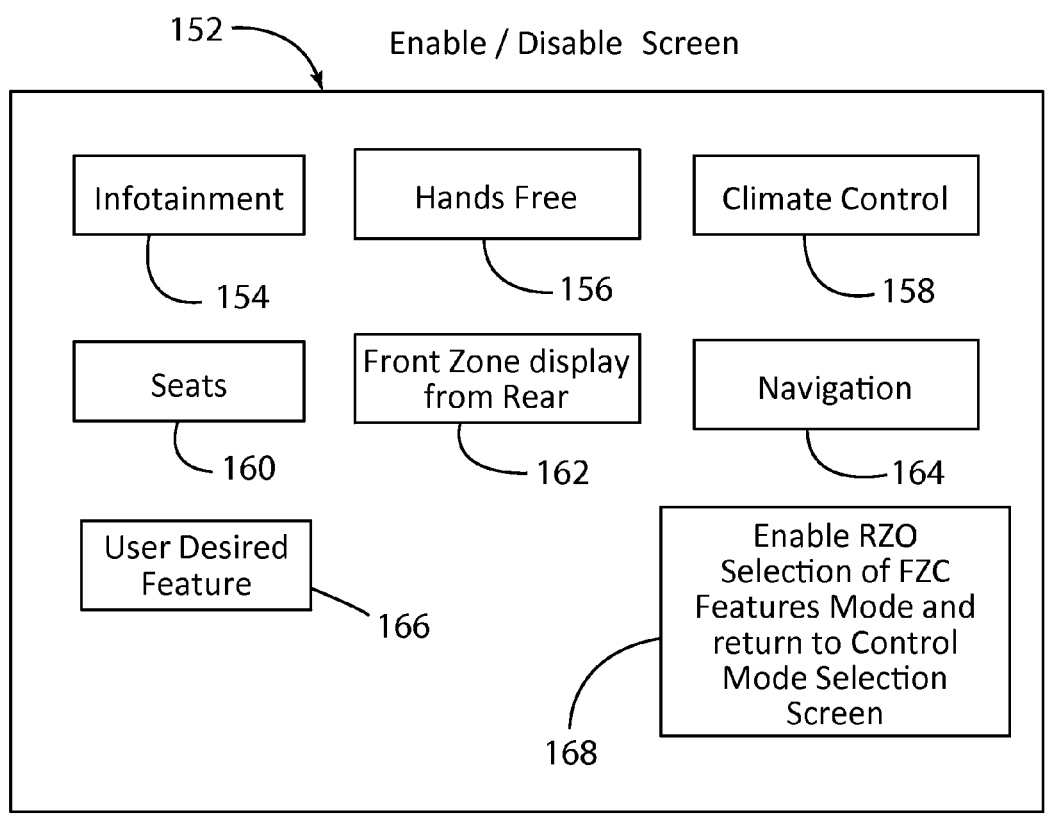
FIG. 8 illustrates an enable/disable screen displayed as a GUI on a rear zone master controller display device in accordance with an embodiment of the invention.

FIG. 8 depicts an enable/disable screen 152 that is displayed when the RZO chooses the RZO selection of FZC features control mode 150 from the control mode selection screen 142 to enable or disable RZO selected features from being controlled by the FZC 108. The enable/disable screen includes enablement or disablement of an infotainment feature, a hands-free feature, a climate control feature, a seat control feature, a front zone display from the RZ feature, a navigation feature, and any other desired feature selected by the RZO. The feature selections are enabled or disabled by selecting one or more of the following options on the enable/disable screen 152s: an infotainment option 154, a hands-free option 156, a climate control option 158, a seat control option 150, a front display from the RZ option 162, a navigation option 164, and a user desired feature option 166. Once the RZO selected features are enabled or disabled, then the enable RZO selection of FZC features control mode and return to control mode selection screen option 168 is selected to enable the RZO selection of FZC features control mode. A warning is then displayed on the FZC display 112 to alert the driver that the OCS is operating in the RZO feature selection control mode. As shown in FIG. 7, the RZO may return to the main screen 134 on the RZMC display 106 by selecting the main screen option 154 on the control mode selection screen 142.

Figure 10:
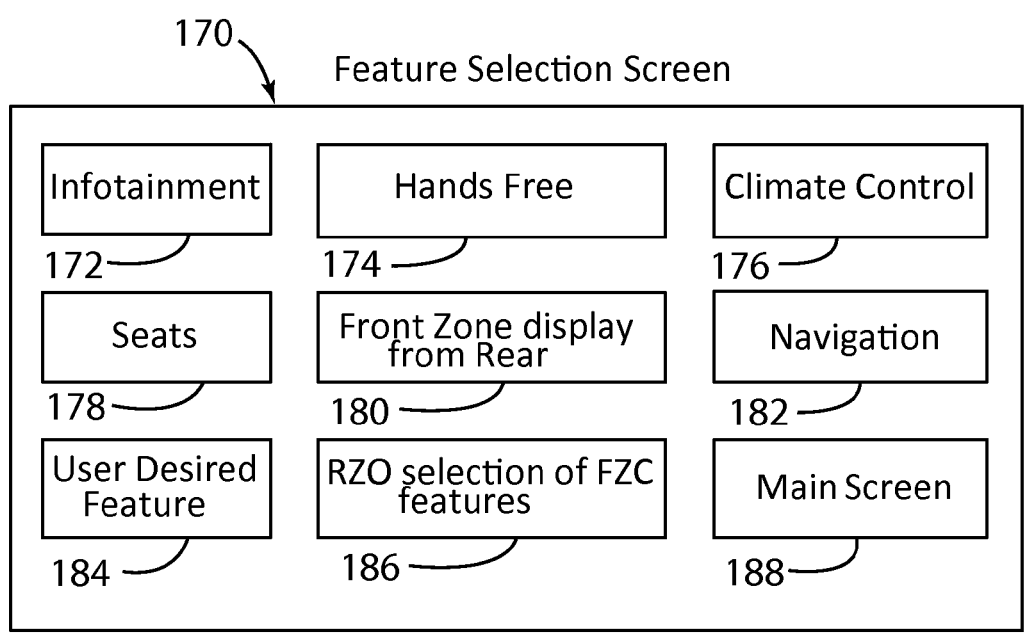
FIG. 10 illustrates a feature selection screen displayed as a GUI on a rear zone master controller display device for a rear zone occupant to select desired vehicle subsystems to control to further select features within the subsystems in accordance with an embodiment of the invention.

FIG. 10 depicts a feature selection screen 170 that is displayed on the RZMC display 106 when the feature selection option 138 is selected from the main screen. In an example of the invention shown in FIG. 10, the features available to be selected by the RZO and controlled by the RZMC 102 include an infotainment feature, a hands-free feature, a climate control feature, a seat control feature, a front zone display from the RZ feature, a navigation feature, and any other desired feature selected by the RZO. The feature selections are activated and optimized by selecting one or more of the following options on the feature selections screen: an infotainment option 172, a hands-free option 174, a climate control option 158, a seat control option 178, a front display from the RZ option 180, a navigation option 182, and a user desired feature option 184.

In an embodiment of the invention, selection of the infotainment option 172 activates the infotainment subsystem 118a; selection of the hands-free option 174 activates the hands-free subsystem 118b, selection of the climate control option 158 activates the climate control subsystem 118c, selection of the seat control option 178 activates the seat control subsystem 118d in further communication with additional seat control functional units including a position unit SC1, a heating and cooling unit SC2, and a massage unit SC3, selection of the monitor front display option activates the monitoring front display subsystem 118e, selection of the navigation option 182 activates the navigation subsystem 118f, and selection of the user desired feature option 184 activates the user desired features subsystem 118g.

While operating in one of the OCS control modes, the RZO can select vehicle subsystems and can further optimize the settings and features in each subsystem, via the RZMC 102, that are normally controlled exclusively by the front zone controller 108. Each subsystem controlled by the RZO using one of the OCS control modes is described in more detail below beginning with the infotainment subsystem 118a.

The infotainment subsystem 118a provides entertainment to the occupants during transit. For example, selection of the infotainment option 172 provides access to numerous infotainment features including accessing one or more of the following features having infotainment functionality including: a media device, a radio, an internet browser, social media, a docking station, or any other infotainment feature that exists or may come into existence that may be used in a vehicle.

The media device may be any device having an audio/visual source such as, but not limited to a CD player, a DVD/Blu-ray player, a video game console, and music players, video games. A media service accessed by the RZMC and displayed on the RZMC display 106 can, for example, provide access to media files, such as song files, audio books, movie files, video clips, and other media data. In some implementations, separate audio and video services can provide access to the respective types of media files.

The infotainment subsystem can also access other data and content over the one or more wired and/or wireless networks using an internet browser. For example, content publishers, such as news sites, RSS feeds, web sites, blogs, social networking sites, developer networks, etc., can be accessed by the infotainment subsystem 118a. Such access can be provided by invocation of a web browsing function or application (e.g., a browser) in response to a user touching, for example, a Web object displayed on the RZMC display 106.

In some implementations, the RZMC 102 via the infotainment subsystem 118a can implement network distribution functionality. For example, the functionality can enable the user to take the infotainment subsystem 118a and provide access to its associated network while traveling. In particular, the infotainment subsystem 118a can extend Internet access (e.g., Wi-Fi) to wireless devices in the vicinity. For example, using the infotainment subsystem 118a, the RZMC 102 can be configured as a base station for one or more devices. As such, the RZMC 102 can grant or deny network access to other wireless devices.

Additionally, the display 106 may be configured to have a social media option where a RZO can access desired social media without having to search for such features on the internet browser. Additionally, the social media option may include a messaging service, for example, to provide e-mail and/or other messaging services. The radio may be AM/FM radio, AM/FM radio with a CD or cassette player, or satellite radio or any other radio system that currently exists or may come into existence.

The infotainment system may include a docking port device, e.g., a Universal Serial Bus (USB) port, or "docking station: or some other wired port connection, can be included. The port device can, for example, be utilized to establish a wired connection to for a variety of occupant communication devices including: music, video, and audio players, gaming devices and controller, earphones, cellphones, computers, or other processing devices capable of receiving and/or transmitting data. In some implementations, the port device allows an occupant communication device to synchronize with a host device using one or more protocols, such as, for example, the TCP/IP, HTTP, UDP and any other known protocol.

While operating in one of the OCS rear zone occupant control modes, the RZO can select the climate control system 118c and then climate control options to optimize the climate in single, dual or multiple zones of a vehicle that is normally controlled exclusively by the front zone controller. The zones include, but are not limited to one or more of the following: dual front and rear zones; dual driver passenger zones; multiple zones including one or more of the following zones: the front driver side zone, a front passenger side zone, a rear driver side zone, and a rear passenger side zone; or a single zone for the entire vehicle. The invention is not limited to the only options described herein but could include combinations of zones that currently exist or may come into existence in the future.

One or more zones in the vehicle may be selected for climate control depending on the seating configuration and features of the vehicle. Typically, at least two selections for climate control operations are available, but depending on vehicle configuration, the second selection or combinations of the selections can change as is well known in the vehicle climate control arts. For example, some vehicles only have single climate control allowing control over the entire vehicle as a single zone; or only dual front and rear control of the front and rear zones or only driver/passenger control of the driver and passenger sides of the vehicle. Once a climate control setting is selected, then the climate is optimized per the RZO selected settings. If rear zone climate control activation not desired, then the rear zone control mode ends and the process continues to the main feature display screen.

Selection of the seat control subsystem 118d allows the RZO to select desired seat control settings including first selecting a seat to control and then selecting one or more of the following non-limiting features: position features such as forward, backward, and recline; heating/cooling features; and massage seat features.

The FZ display monitoring subsystem 118f allows the RZO to monitor the FZ display and may be implemented via hardware or software in the RZMC controller 102. Selection of the navigation control allows the RZO to monitor the navigation features displayed on the FZC display and to disable the FZC of navigation features if RZO control of the navigation is desired or to enable the FZ controller to control navigation if the FZC is enabled. If the FZC is disabled, then a warning is sent to the FZC display to warn the driver that the RZMC is controlling the navigation functionality of the OCS.

In an embodiment of the invention, a destination may be set and maps displayed on both the front and rear controllers depending on whether the FZC is disabled or not. Any additional navigational settings may be optimized depending on the RZO selections.

Selection of the User desired features control allows for additional available vehicle functions that exist or may come into existence to be controlled by the RZMC. In an embodiment of the invention, the user desired feature control subsystem 118g is a representative system of any electrically or electronically activated feature that currently exists or may come into existence in the future that may be available in a vehicle for a RZO to control. In an embodiment of the invention, the rear zone occupant desired features may be limited to features that are not essential to the basic driving (required functions) for the operation of a moving vehicle. Such user desired feature control subsystems may include, but are not limited to: lights, rear-seat concealed table, adaptive variable air suspension that allows selection between comfort, normal, or sport, electronic unlocking/locking (via interior door lock/unlock switches), vehicle lighting (interior and/or exterior), and electronic power windows. The RZO selection of features option 186 on the feature selection screen 170 displays an RZO selection of features screen 190 as shown in FIG. 19.

Figure 19:
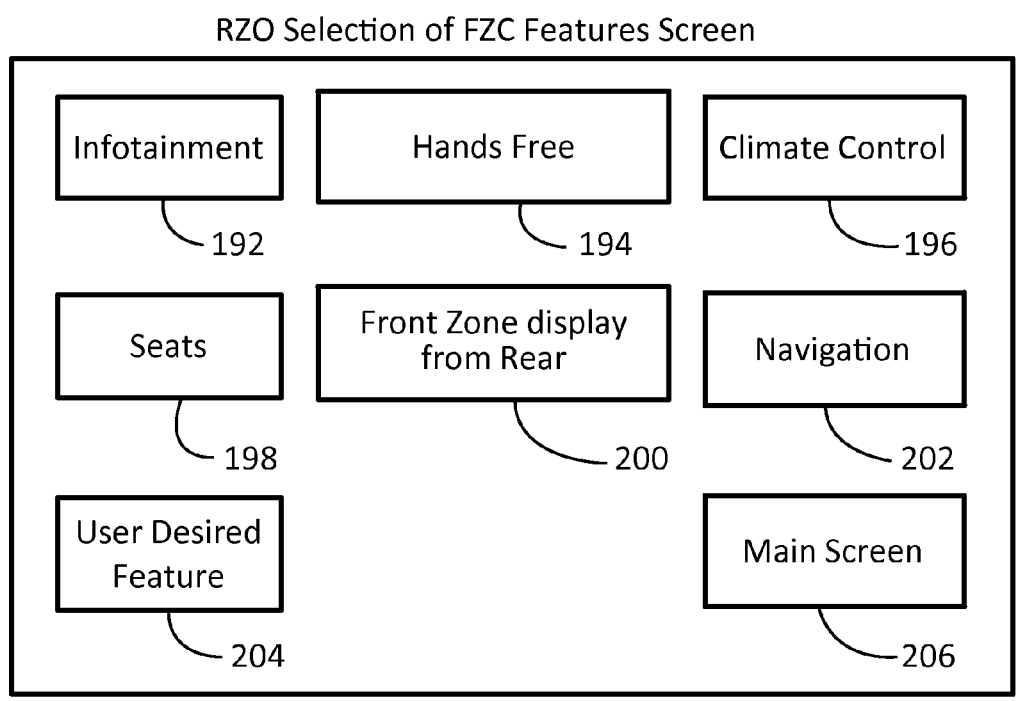
FIG. 19 illustrates a sub-menu that is displayed when the rear zone occupant selection of front zone control Features option is selected from the Feature Selection screen shown in FIG. 10 in accordance with an embodiment of the invention.

FIG. 19 depicts the RZO selection of features screen 190 in accordance with an embodiment of the invention. The screen 190 functions in a similar manner as does the enable/disable screen 152 described with reference to FIG. 8 to allow the RZO to selectively enable or disable individual vehicle features by selecting the following options on the RZO selection of features screen 190: an infotainment option 192, a hands-free option 194, a climate control option 196, a seat control option 198, a front display from the RZ option 200, a navigation option 202, and a user desired feature option 204.

To exit the RZO selection of features screen 190, the RZO may return to the feature selection screen 170 on the RZMC display 106 by selecting the main screen option 206 on the feature selection screen 170. Referring once again to FIG. 10, the RZO may return to the main screen 134 on the RZMC display 106 by selecting the main screen option 188 on the feature selection screen 170.

Figure 3:
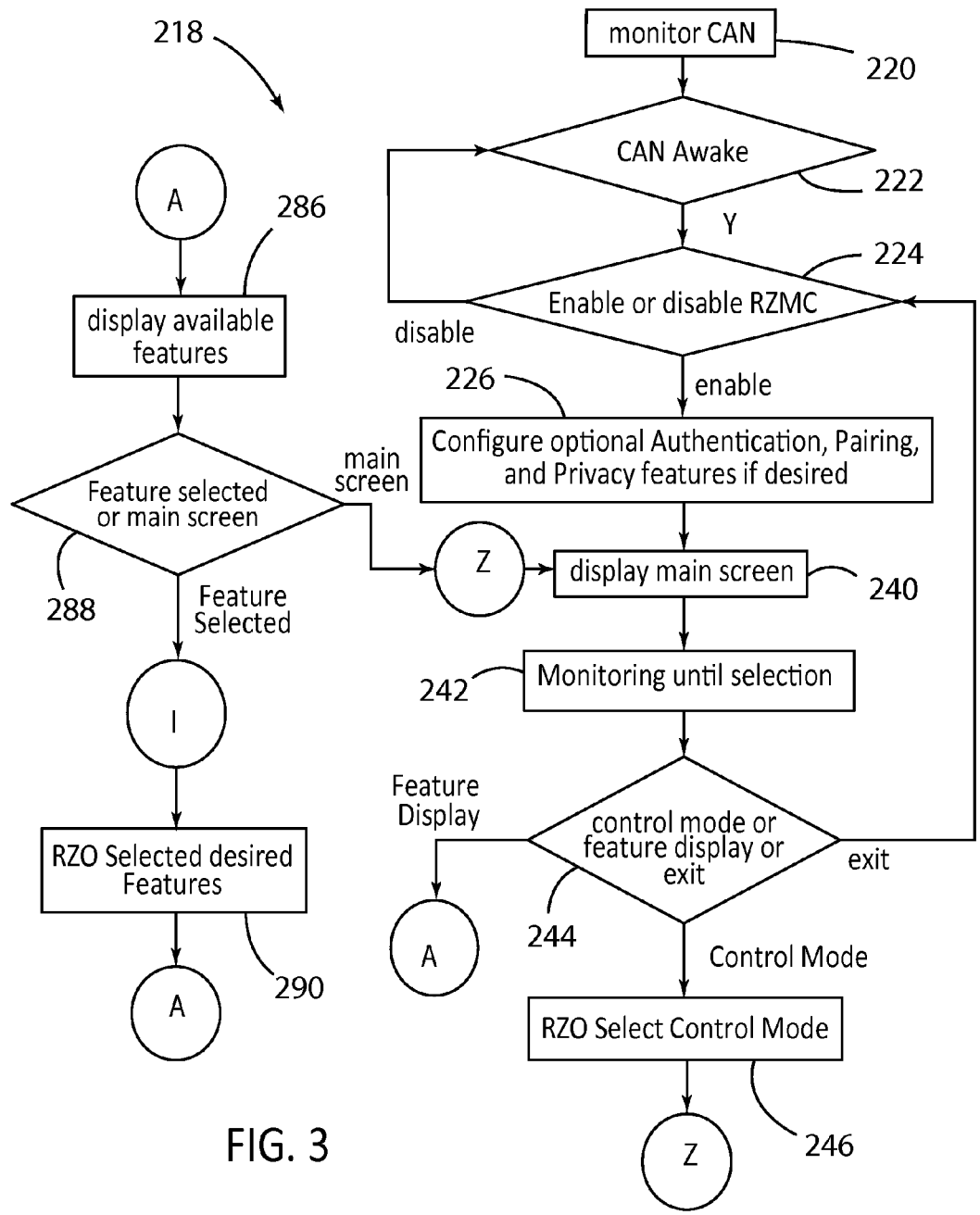
FIG. 3 illustrates a method of controlling the occupant communication system of FIG. 1 in accordance with an embodiment of the invention.

A method of operating the Occupant Communications System in a control mode selected by the rear zone occupant is disclosed in the flowchart in FIG. 3.

Initially, the method includes monitoring 220 the vehicle communications network, including vehicle Controller Area Network (CAN) communications. During the monitoring process, a determination 222 is made whether the vehicle communications system is awake. If the CAN communications is not awake, the OCS continues to monitor 220 the CAN communications until an awake event occurs. In one example a CAN awake event is enablement of the RZMC, which may occur when the RZMC is activated or turned on.

Figure 4:
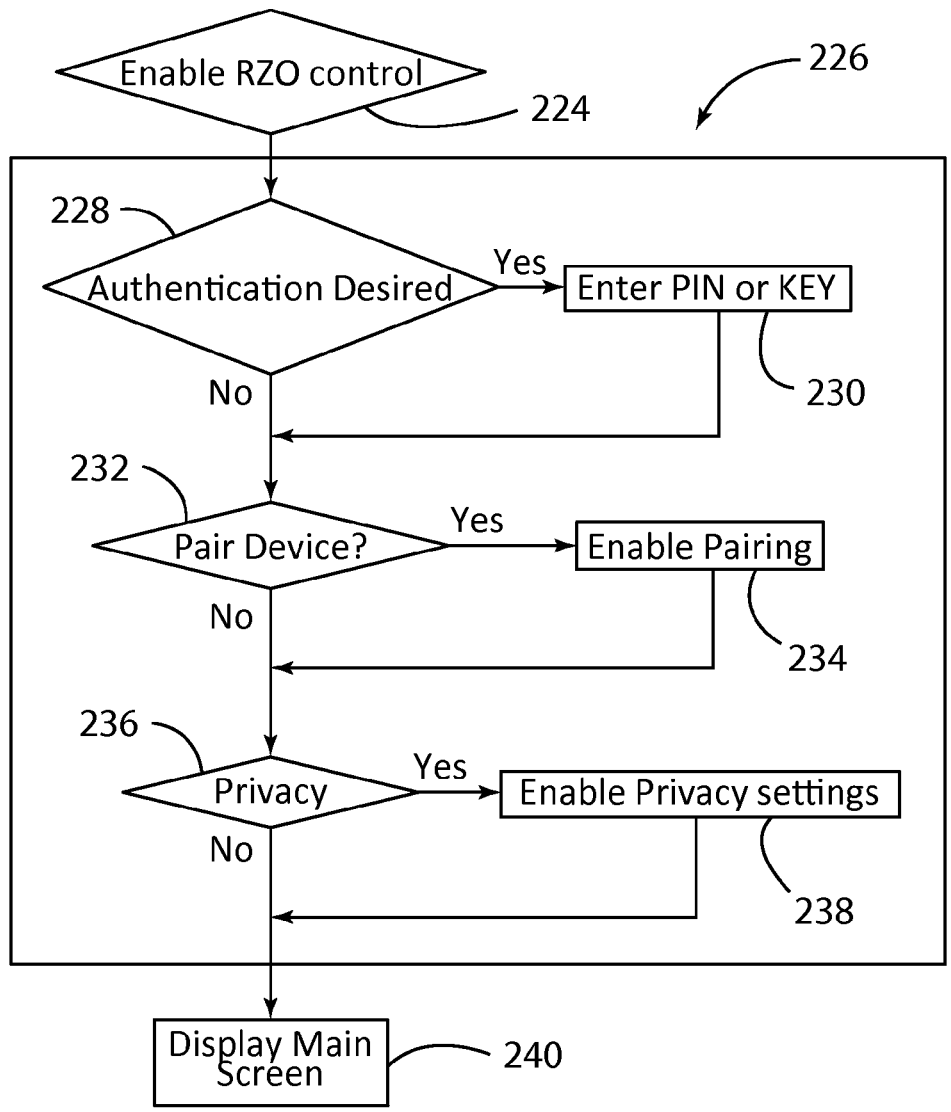
FIG. 4. illustrates a more detailed view of the authentication, pairing and privacy mode process shown in FIG. 3.

If a CAN awake event occurs, a determination 224 is made whether to enable or disable the RZMC. If the RZMC is enabled, the RZMC transmits controller electrical communication signals via, for example, wireless protocol signals to the communications module and to the CAN. Upon enablement the RZMC has full functional control of all of the vehicle features selected by a RZO that are not essential for the basic driving functions or operation of a moving vehicle. In addition, a determination is made whether additional optional authentication, pairing, and RZO privacy features are desired. FIG. 4 shows a process 226 for selecting authentication, pairing, and RZO privacy.

The OCS may be customized for each passenger through authentication, pairing and privacy functions as shown in FIGS. 2 and 4. However, one or more of the authentication, pairing, privacy functions may be provided as an optional feature in an embodiment of the invention or may be skipped altogether to directly select a control mode and feature options as disclosed in more detail below.

Initially, a determination 228 is made whether authentication is desired. If authentication of the rear zone occupant to use the OCS is required, then, a PIN or KEY associated with a RZO is entered 230 into the RZMC and a determination 232 is made whether to PAIR the occupant's OCD to the OCS. If authentication is not required, then a determination 232 is made whether to PAIR a desired OCD to the OCS. If pairing the OCD to the OCS is desired, then pairing is enabled 234 and a determination 236 is made whether to enable a privacy mode blocking the FZC display from displaying any of the feature selections made by the RZO. As shown in an embodiment of the invention in FIG. 2, the OCD pairs with the RZMC if the occupant is a rear zone occupant (RZO) or with the front zone controller (FZC) if the occupant is a front zone occupant (FZO) as discussed previously herein.

In an embodiment of the invention, the OCS operates in a privacy mode targeted to give the RZO experience and control to only display features that an identified RZO prefers to the identified RZO and not to any occupants in the front zone. The RZMC determines whether privacy is desired to only display specific information associated with the paired and authenticated device based on the identified OCD. If privacy is desired, then the privacy settings are enabled 238 and the RZO feature selections and functions are blocked from display or viewing by the FZO.

Such privacy settings may be enabled by using a private pin, key, authenticated (via Bluetooth Pairing, WiFi) BYOD (bring-your-own-device) to access and refocus certain vehicle functions to the RZO.

Figure 6:
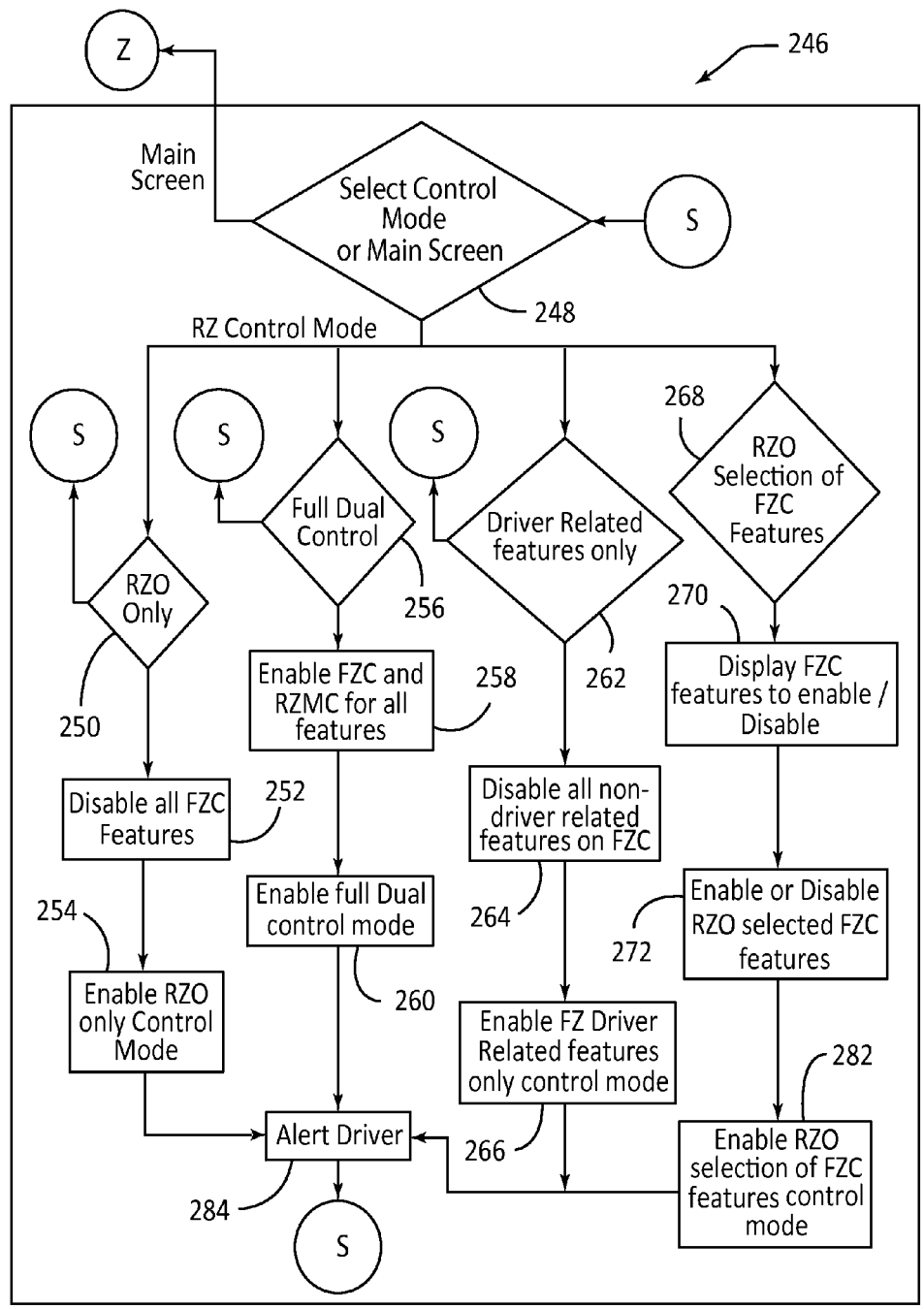
FIG. 6 illustrates a more detailed view of the occupant communication system control mode selection process shown in FIG. 3.

Referring now to FIG. 3, once the RZMC is enabled and authentication, pairing, and privacy determinations are made or optionally bypassed, a main display screen on the RZMC display interface is displayed 240. Next the RZMC is monitored 242 to determine whether a RZ occupant control mode is selected or the RZO chooses to select desired features or whether a RZO chooses to exit use of the RZMC. In the present example, the RZMC 102 monitors multiple sensors via the vehicle communication system 116 to detect activation of RZMC feature selections to control individual subsystems, control settings to choose a RZ occupant control mode to operate in, and exit options. An interface display may be displayed on the RZMC display such as a main screen offering several RZMC control choices. For example, each option on the RZMC main display screen may be selected by being touched or through a voice command or any other means to select options on a display. Next, a decision 244 is made to select an RZ Occupant control mode to enable the RZMC to control the FZC or to display individual feature selections on the RZMC display interface. If the RZO selects the OCS control mode to enable, then a control mode selection process 246 is performed. As shown in FIG. 6, an initial determination 248 is made to select a control mode or to return to the main screen. If no control mode is selected, then the previously selected control mode is used and the process returns to step 240 to display the RZMC main screen.

The RZO may choose to select a control mode, for example, a RZMC Only Control Mode, a Dual Controller Mode, a FZ Driver-related Information Only Mode, or a Front Zone RZO Selected Features Control Mode. These selections are shown in more detail on the control mode selection screen 142 shown in FIG. 7. If the RZO only control mode is selected from the control mode selection screen 142, then a determination 250 is made as to whether the RZO only control mode is desired. If the RZO only control mode is not desired, then the control mode selection screen 142 is once again displayed 248.

If the RZO control mode is selected, then all of the FZC features are disabled 252 and the RZO only control mode is enabled 254, thus, enabling the RZMC to control all available vehicle features in both the FZ and the RZ of the vehicle when the vehicle is not moving. This RZO control mode may not be available in some regions where government regulations prevent driver-related features to be disabled. If such a mode were not allowed, then this feature would not be included in the OCS or would not be available to be selected in the control mode selection screen. Next, an alert is sent to the driver (284) warning the driver that the FZC is operating in the RZO ONLY CONTROL MODE. After the RZO ONLY CONTROL MODE alert is sent, the process returns to display the control mode selection screen 142.

If the Full Dual control mode is selected from the control mode selection screen 142, then a determination 256 is made as to whether the Full Dual control mode is desired. If the Full Dual control mode is not desired, then the control mode selection screen 142 is once again displayed 248. If the Full Dual control mode is selected, then all of the FZC features are enabled 258 and the RZMC features remain fully enabled as disclosed with reference to step 224 and the Full Dual control mode is enabled 254, thus, enabling either the FZC or the RZMC to control all available vehicle features in both the FZ and the RZ of the vehicle as desired by either the FZO or RZO. Next, an alert is sent to the driver (284) warning the driver that the OCS is operating in the FULL DUAL CONTROL MODE. After the FULL DUAL CONTROL MODE alert is sent, the process returns to display the control mode selection screen 142.

If the front zone driver related features only control mode is selected from the control mode selection screen 142, then a determination is made as to whether front zone driver related features only control mode is desired 262. If front zone driver related features only control mode is not desired, then the control mode selection screen 142 is once again displayed 248. If the front zone driver related features only control mode is selected, then all of the non-driver related features are disabled 264 on the FZC and the front zone driver related features only control mode is enabled 266, thus, enabling the RZMC to control all available vehicle features except for driver-related features in both the FZ and the RZ of the vehicle and to completely block or prevent any access or display of non-driver related vehicle features on the FZC and FZC display. Thus, the FZO access to control over the FZC controls and display is limited to driver-related features only. When operating the front zone driver related features only control mode, the RZMC prevents the driver from expanding the front zone controller features or functions to any features or functions that are not related to driver-related features. Next, an alert 284 is sent to the driver warning the driver that the FZC is operating in the FRONT ZONE DRIVER RELATED FEATURES ONLY CONTROL MODE. After the FRONT ZONE DRIVER RELATED FEATURES ONLY CONTROL MODE alert is sent, the process returns to display the control mode selection screen 142.

If the RZO selection of FZC features control mode is selected from the control mode selection screen 142, then a determination 268 is made as to whether the RZO selection of FZC features control mode is desired. If the RZO selection of FZC features control mode is not desired, then the control mode selection screen 142 is once again displayed 248.

If the RZO desires that the FZO have limited access to the FZC display and features or functions in addition to driver-related features or functions and information then the RZO uses the RZMC to select additional desired features or functions that may be controlled and displayed by the FZC and the FZC then operates in a RZO selection of FZC features control mode. When operating the RZO selection of FZC features control mode, the RZMC prevents the driver from expanding the front zone controller features or functions to any features or functions not specified by the RZMC and from displaying any features or functions not specified by the RZMC beyond the driver-related functions and information. To select the features that the FZO may access when operating in the RZO selection of FZC features control mode, first, the selection options that may be enabled or disabled are displayed when the RZO selection of FZC features control mode is selected 270. FIG. 8 shows selections of the RZO desired features to enable or disable on the FZC and FZC display.

Figure 9:
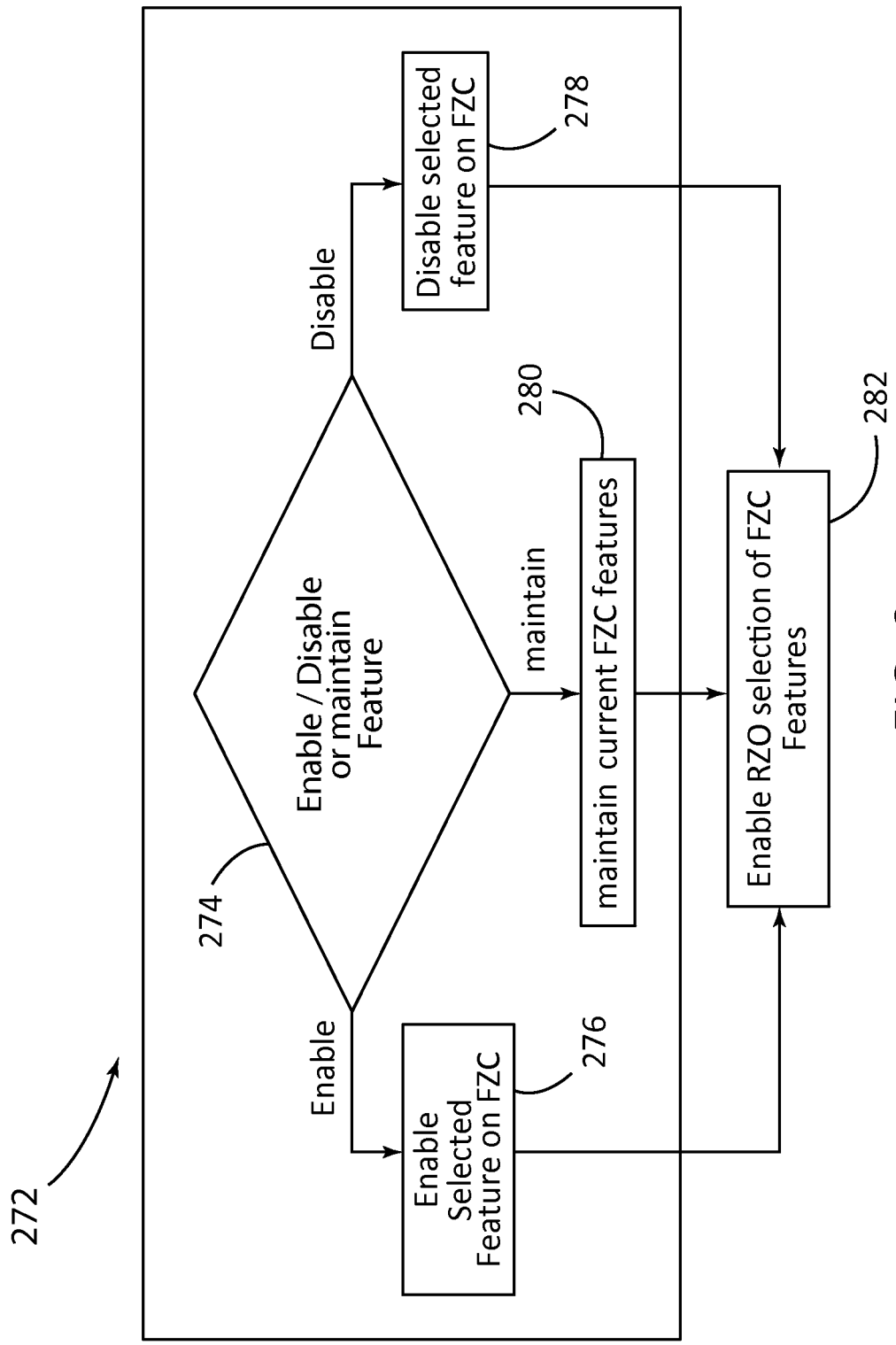
FIG. 9 illustrates a more detailed view of the enablement or disablement of a rear zone occupant's selected front zone controller features process shown in FIG. 6.

FIG. 9 shows an RZO enabling or disabling 272 a selected FZC feature, including making a decision 274 whether to enable or disable or maintain a current feature selection of one or more displayed FZC features. If no feature is selected to enable or disable, then the previous enablement/disablement settings are maintained 280 and the RZO selection of FZC features control mode is enabled 282. Next, an alert is sent to the driver warning the driver that the FZC is operating in the RZO SELECTION OF FZC FEATURES CONTROL MODE.

If the feature is selected to be enabled or disabled, then upon selection of the feature, the feature is either enabled 276 or disabled 278. Enablement or disablement can be performed by turning on or off or toggling a soft or hard switch or by any other means that operates to enable or disable a specified vehicle feature. If a feature is selected to enable or disable, then the desired feature is enabled or disabled per the RZO selection 272 and the RZO selection of FZO display is enabled 282. Next, an alert 284 is sent to the driver warning the driver that the FZC is operating in the RZO SELECTION OF FZC FEATURES CONTROL MODE. After the RZO SELECTION OF FZC FEATURES CONTROL MODE alert is sent, the process returns to display the control mode selection screen 142. If the OCS control mode is not selected by the RZO and the RZO does not desire to disable the RZMC, then the OCS operates in the previously selected control when the OCS was last enabled.

FIG. 10 shows a feature selection screen 170 wherein the RZO can choose to display 286 individual subsystems or features within the vehicle to control while operating in one of the OCS rear zone occupant control modes. Once individual features have been displayed 206, a decision is made whether to display one or more of the subsystems or features to select or to return to the main screen 288. If the RZO chooses to select a subsystem or feature, then the RZO selects the desired subsystem or feature 290.

Figure 11:
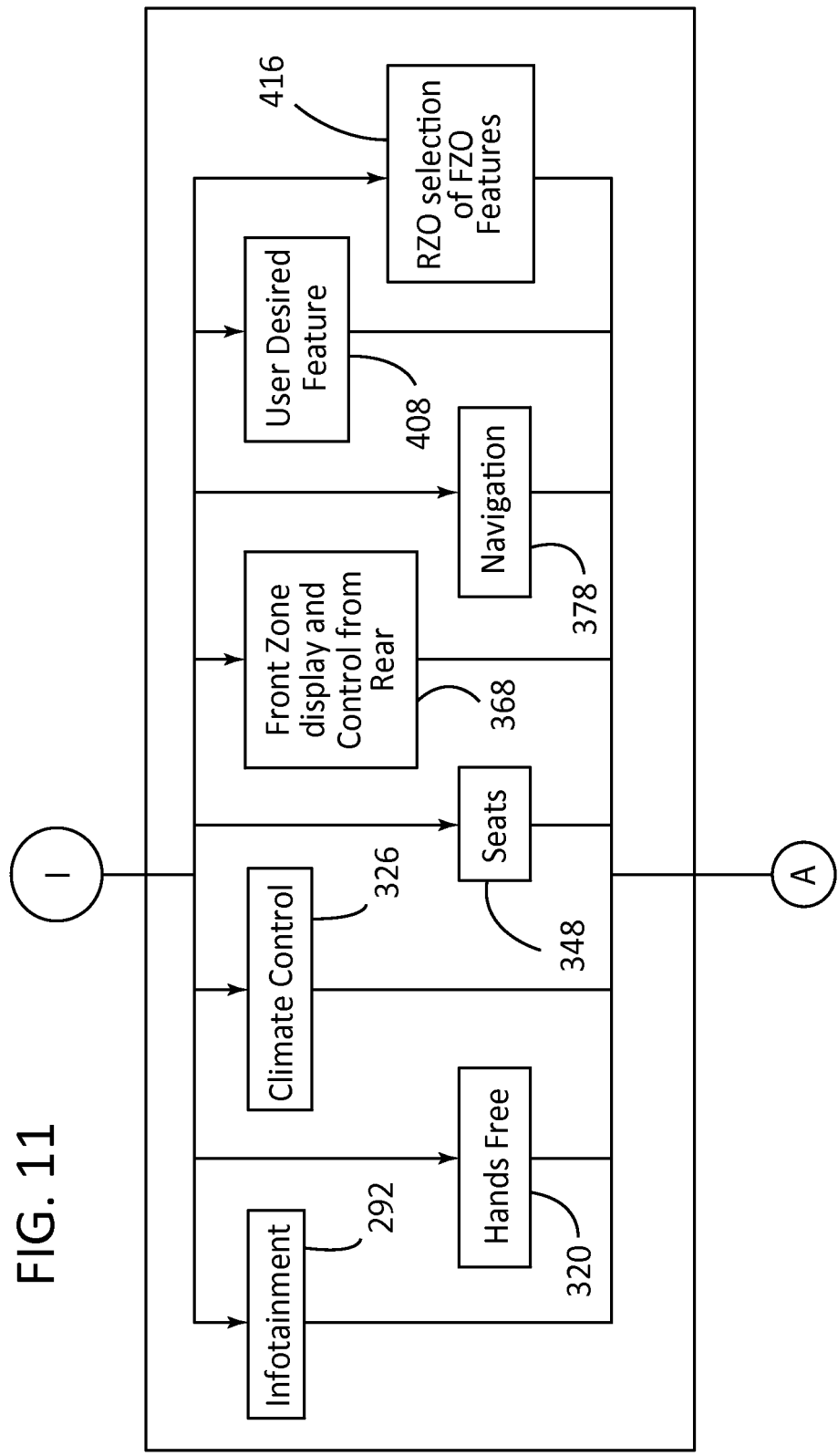
FIG. 11 illustrates a more detailed view of the rear zone occupant selection of desired features process shown in FIG. 3, wherein each of the features shown in FIG. 11 represent a vehicle subsystem that is selected and optimally controlled by the occupant communication system in accordance with an embodiment of the invention.

FIG. 11 illustrates a block flow diagram of subsystem selection operation for all of the subsystems including a block diagram control process for the selection and optimization of each desired subsystem or feature within the OCS including infotainment 292, hands-free 320, climate control 326, seats 348, front zone display and control from rear 368, navigation 378, any user desired feature 408, and RZO selection of FZO features 416. Additionally, FIGS. 12-19 show more detailed views of the specific selection of each subsystem and optimization of selected features available within each subsystem.

Figure 12:
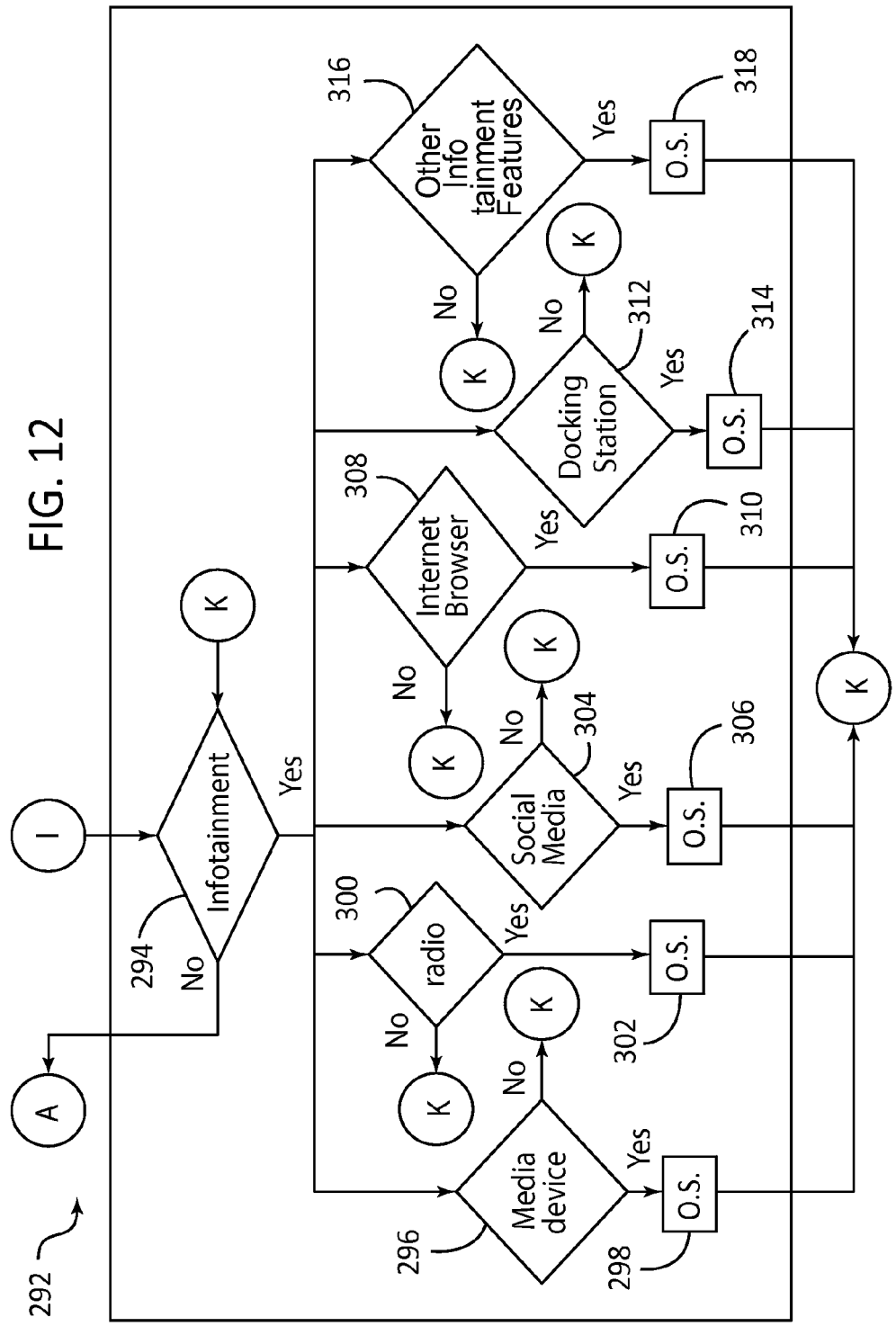
FIG. 12 illustrates a more detailed view of the Infotainment subsystem selection and optimization process shown in FIG. 11 in accordance with an embodiment of the invention.

FIG. 12 shows a more detailed view of an infotainment subsystem selection and optimized settings process 292 as shown in FIG. 11. FIG. 12 shows a process 292 of selecting an infotainment subsystem and features controlled by the infotainment subsystem. Initially, a determination 294 is made whether the infotainment subsystem selection is desired. If the RZO does not desire to select features within the infotainment subsystem, then the process returns to displaying the feature selection screen 282.

If the infotainment subsystem is selected, then a decision is made 296, 300, 304, 308, 312, 316 as to what individual feature within the infotainment subsystem 118a is desired, wherein each individual infotainment feature selection includes selection of: a media device 296, a radio 300, accessing social media 304, accessing an internet browser 308, connecting to a docketing station 312 or any other infotainment feature that exists or may come into existence 316. An infotainment display screen may be displayed to allow selections of each of the features. If the feature is desired, then, then feature is selected and the settings for the feature are optimized; see process 298, 302, 306, 310, 314, 318 and the process then returns to once again determining 294 whether the infotainment system is desired. If one of the infotainment features was not desired, the process then returns to the determining step 294.

Figure 13:
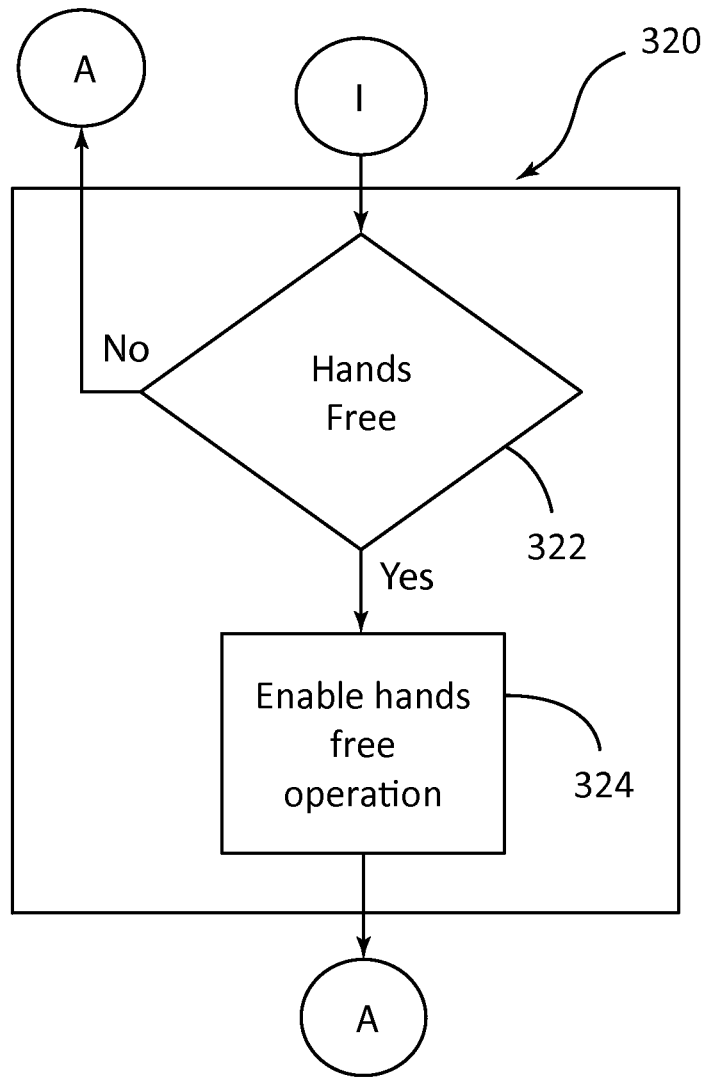
FIG. 13 illustrates a more detailed view of the Hands-free subsystem selection and optimization process shown in FIG. 11 in accordance with an embodiment of the invention.

FIG. 13 shows a more detailed view of the hands-free subsystem selection process 320 shown in FIG. 11. Initially, a determination 322 is made whether the hands-free subsystem is desired. If the RZO does not desire to select the hands-free subsystem, then the process returns to displaying the feature selection screen 282. If the RZO does desire to select the hands-free subsystem, then the hands-free option is enabled 324 for an OCD that is paired with the RZMC, and then the process returns to displaying the feature selection screen 282.

Figure 14:
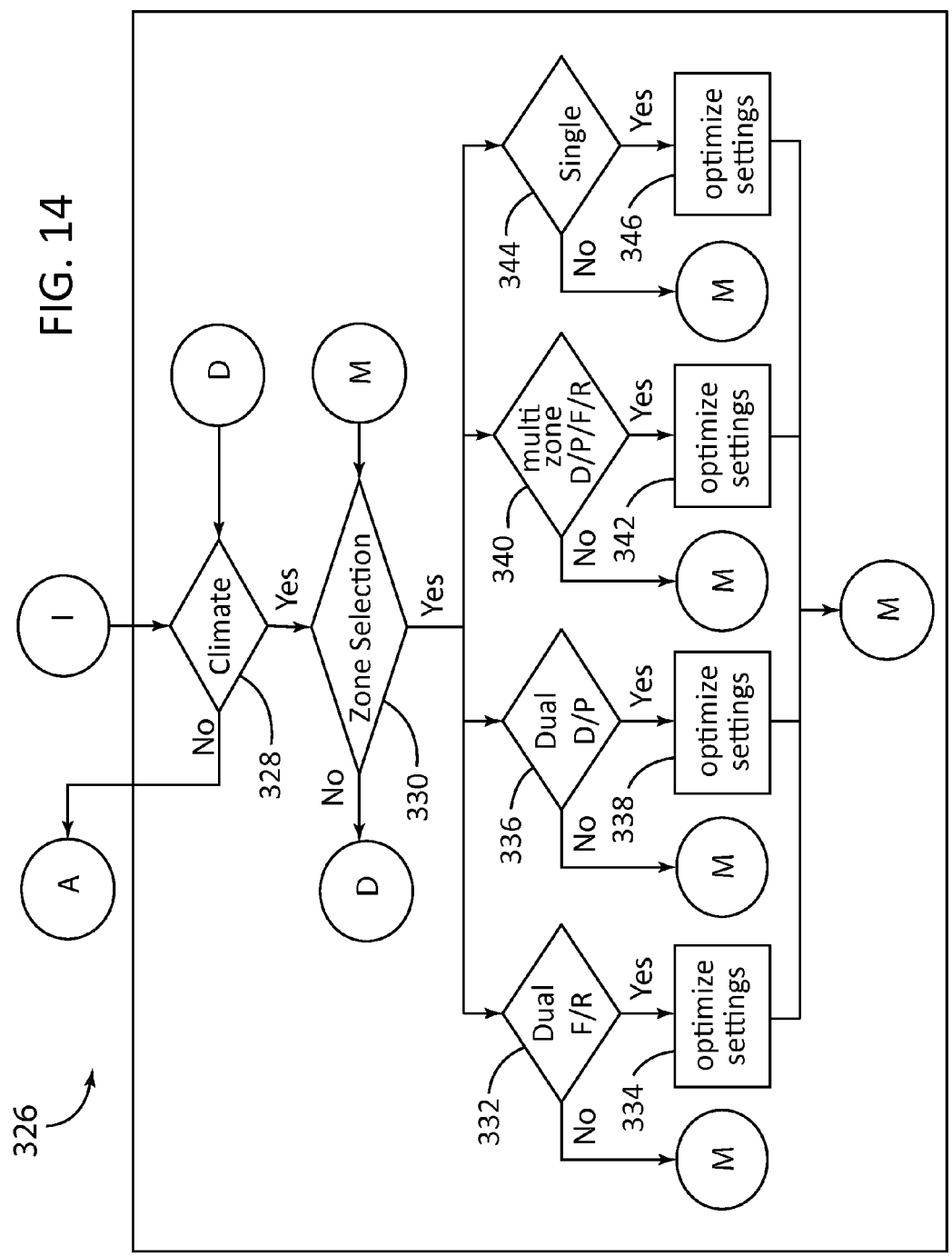
FIG. 14 illustrates a more detailed view of the Climate Control subsystem selection and optimization process shown in FIG. 11 in accordance with an embodiment of the invention.

FIG. 14 shows a more detailed view of the climate control subsystem selection and optimized settings process 326 shown in FIG. 11. Initially, a determination 328 is made whether the climate control subsystem selection is desired. If the RZO does not desire to select features within the climate control subsystem, then the process returns to displaying the feature selection screen 282. If the climate control system is selected, then another decision 330 is made whether zone selection is desired. If no zone selection is desired, then the process returns to determining whether the climate control subsystem selection is desired 328. If zone selection is desired then a decision 332, 336, 340, 344 is made as to what zone within the vehicle is desired including, but not limited to: dual front and rear zones 296, a dual driver side zone and passenger side zone, i.e. either side of a vehicle 336, multi-zones including selective control over driver side zone, passenger side zone, front zone, or rear zone or combinations of selections of each of the zones 340, single zone control for selecting a single climate for the entire vehicle. If a particular zone is not desired, then, then the process returns to once again determining 330 whether zone selection is desired. If a particular zone is desired, then, feature settings within the selected zone are optimized to adjust the climate within each selected zone, and the process then returns to once again determining 330 whether zone selection is desired.

Figure 15:
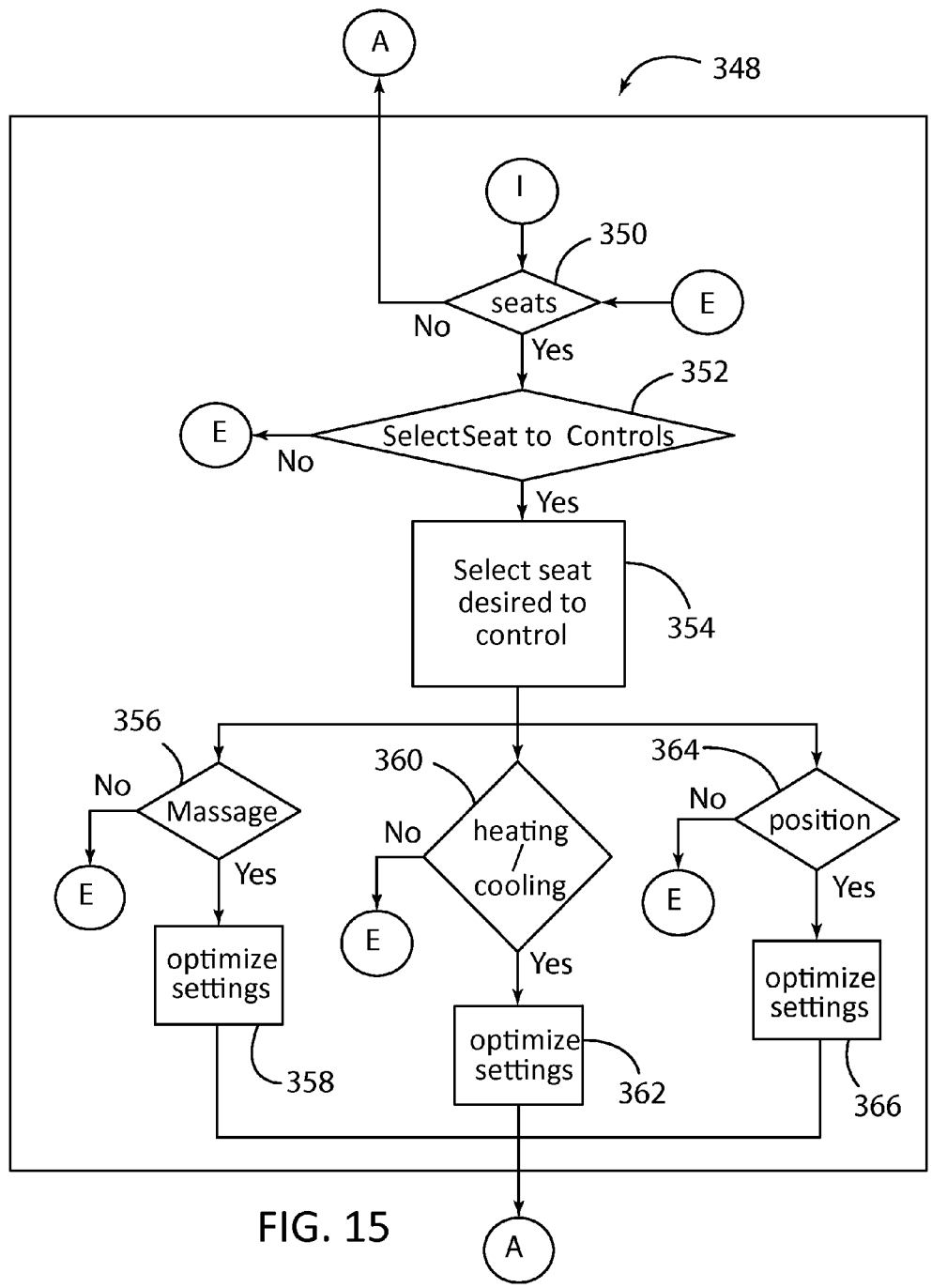
FIG. 15 illustrates a more detailed view of the Seat Control subsystem selection and optimization process shown in FIG. 11 in accordance with an embodiment of the invention.

FIG. 15 shows a more detailed view of the seat control subsystem selection and optimized settings process 348 shown in FIG. 11. Initially, a determination 350 is made whether the seat control subsystem selection is desired. If the RZO does not desire to select features within the seat control subsystem, then the process returns to displaying the feature selection screen 282. If the seat control system is selected, then another decision 352 is made which seat to control. If no seat selection is desired, then the process returns to determining 350 whether the seat control subsystem selection is desired. If selection of a seat is desired, then a seat is selected 354 and then it is determined what seat control feature is to be controlled within the vehicle: massage 296, heating/cooling 360, position 364 or any other seat control feature that exists or may come into existence. If a particular feature is not desired, then, then the process returns to once again determining 350 whether the seat control subsystem selection is desired. If a particular seat control feature is desired, then, feature settings for the selected seat are optimized to adjust the seat as specified and the process then returns to once again determining 330 whether zone selection is desired.

Figure 16:
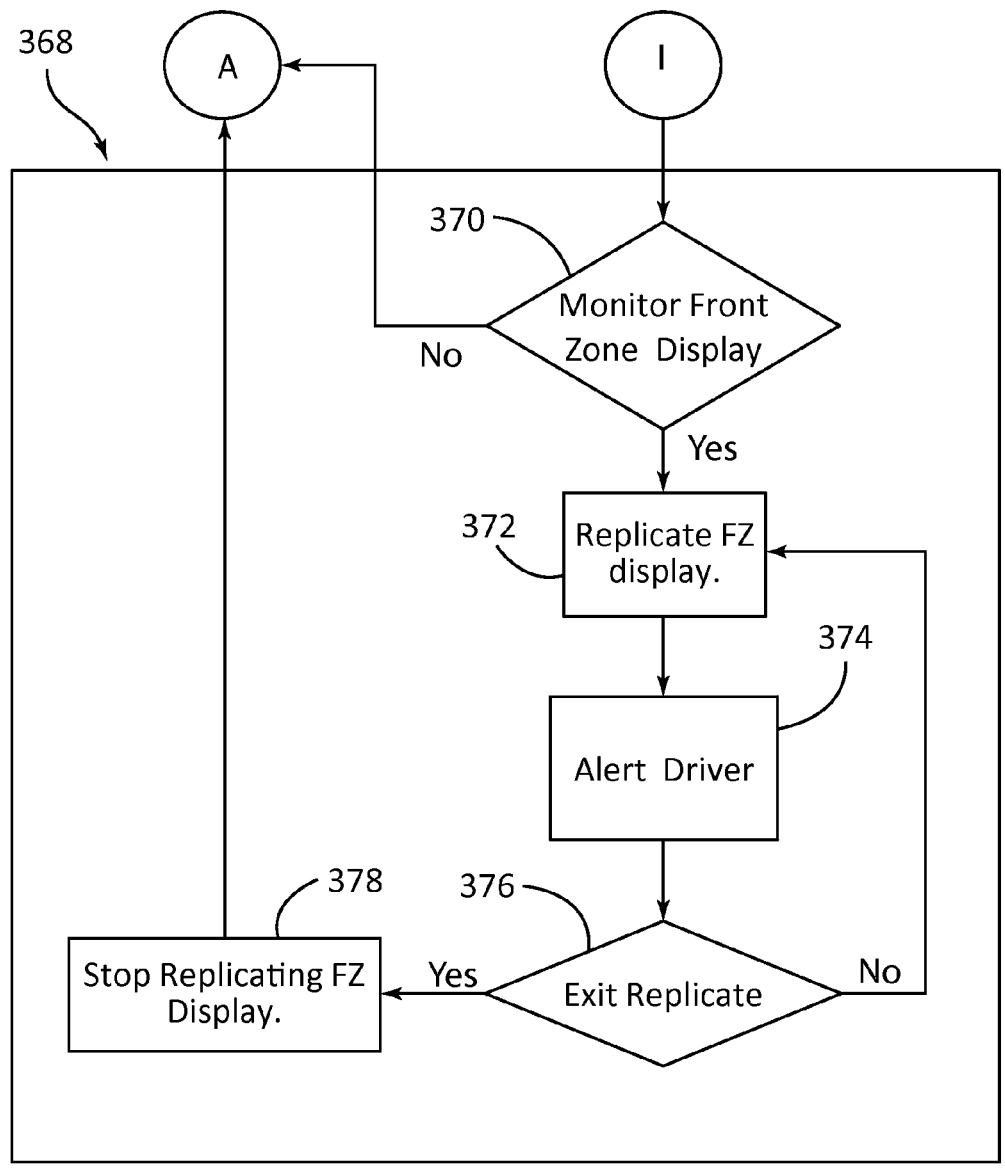
FIG. 16 illustrates a more detailed view of the Front Zone Display Monitoring subsystem selection and optimization process shown in FIG. 11 in accordance with an embodiment of the invention.

FIG. 16 shows a more detailed view of the monitor front zone control subsystem selection and optimized settings process 368 shown in FIG. 11. Initially, a determination 370 is made whether the monitor front zone display subsystem selection is desired. If the RZO does not desire to select features within the monitor front zone display subsystem, then the process returns to displaying the feature selection screen 282. If the RZO does desire to select features within the monitor front zone display subsystem, then the features on the FZ display are replicated on the RZMC display 372 and the driver is sent an alert 374 indicating that the FZ display is being monitored by the RZO. Next, a decision 376 is made whether to stop or exit the replication of the FZ display. If the decision is made to stop replication of the front zone display, then replication 378 is stopped and the process returns to displaying the feature selection screen 282. If the decision is made to continue replication of the front zone display, then the process continues to the step of continuing FZ display replication 372 and the process of continuing to alert the driver 374 and determining whether to stop replication of the FZ display 376 are repeated until replication is stopped 378 and then the process returns to displaying the feature selection screen 282.

Figure 17:
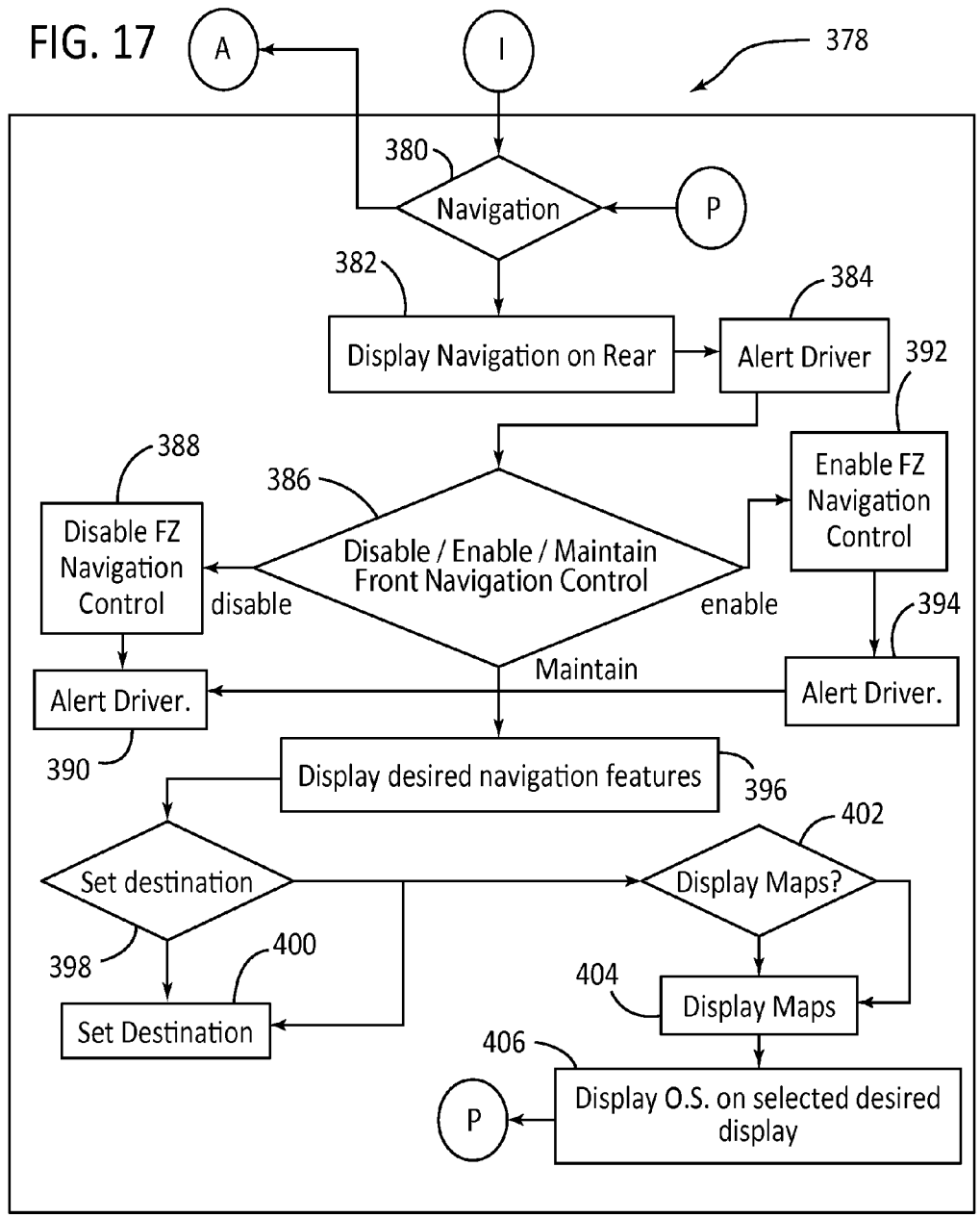
FIG. 17 illustrates a more detailed view of the Navigation Control subsystem selection and optimization process shown in FIG. 11 in accordance with an embodiment of the invention.

FIG. 17 shows a more detailed view of the navigation control subsystem selection and optimized settings process 378 shown in FIG. 11. Initially, a determination 380 is made whether the navigation control subsystem selection is desired. If the RZO does not desire to select features within the navigation control subsystem, then the process returns to displaying the feature selection screen 282. If the RZO does desire to select features within the navigation control, then the navigation control features and display are displayed on the RZMC display 382 and the driver is sent an alert 384 indicating that the navigation control features and display are displayed on the RZMC by the RZO. Next, a decision 386 is made whether to enable, disable, or maintain FZC navigation control. If maintaining FZC navigation control is selected, then the FZC maintains control of the navigation control features as previously selected during an earlier time and the navigation features are displayed 396.

If enablement of the FZC navigation control is desired, then the FZC is enabled 392 to control navigation features including navigation display on the FZC display. Next, the driver is sent an alert 394 indicating that the FZC is controlling vehicle navigation functions. If disablement of the FZ navigation control is desired, then the FZC is disabled 388 from controlling navigation features including navigation display on the FZC display. Next, the driver is sent an alert printer 90 indicating that the FZC is not controlling vehicle navigation functions 388. Thus, when FZ navigation control is disabled, the RZO controls the navigation functions via the RZMC 102.

Next, the navigation features are displayed 396 and a determination is made whether to set a destination 398. If no destination is set, and then a decision if made whether to display maps 402. If a determination is made to set a destination, then a destination is set 400 and then a decision is made whether to display maps 402. If no maps are displayed, then the optimization settings are displayed for any additional navigation features and selected as desired on the desired display 406. If a determination is made to display maps, then the maps are displayed 404 and then the optimization settings are displayed for any additional navigation features and selected as desired on the desired display 406. The process then returns to make a determination whether the navigation control subsystem selection is desired 380.

Figure 18:
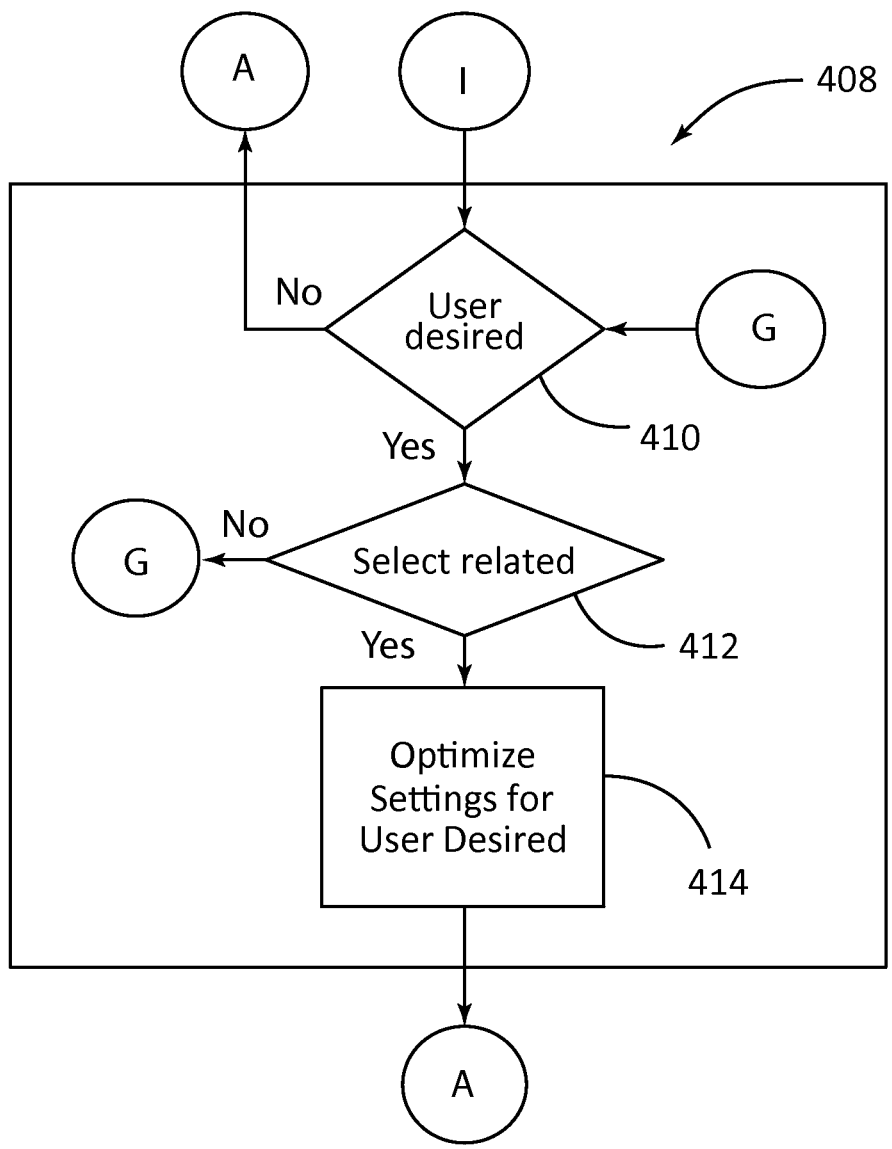
FIG. 18 illustrates a more detailed view of the User Desired Features subsystem selection and optimization process shown in FIG. 11 in accordance with an embodiment of the invention.

FIG. 18 shows a more detailed view of the user desired feature control subsystem selection and optimized settings process 408 shown in FIG. 11. Initially, a determination 410 is made whether the user desired subsystem or feature selection is desired. If the RZO does not desire to select the user desired subsystem, then the process returns to displaying the feature selection screen 282. If the RZO does desire to select the user desired subsystem, then a determination 412 is made to whether to select any related features or options within the user desired subsystem. If the RZO does not desire to select features within the user desired subsystem, then the process returns to determining whether the user desired subsystem or feature selection is desired 410.

FIG. 20 shows a more detailed view of the FZC feature enablement/disablement subsystem selection and optimized settings process 416 shown in FIG. 11. Initially, a determination 418 is made whether the FZC feature enablement/disablement subsystem selection is desired. If the RZO does not desire to select features within the FZC feature enablement/disablement subsystem, then the process returns to displaying the feature selection screen 282. If the RZO does desire to select features within the FZC feature enablement/disablement subsystem, then the FZC features to enable or disable are displayed 420 on the on the on the RZMC display 420 as shown in the RZO selection of features screen 190 in FIG. 19

Next, a decision is made whether to enable or disable 422 or maintain a current feature selection of one or more displayed FZC features. If no feature is selected to enable or disable, then the previous enablement/disablement settings are maintained 430 and the process returns to determining whether the FZC feature enablement/disablement subsystem selection is desired 418. If the feature is selected to be enabled or disabled, then upon selection of the feature, the feature is either enabled 424 or disabled 426. Enablement or disablement can be performed by turning on or off or toggling a soft or hard switch or by any other means that operates to enable or disable a specified vehicle feature. If the feature is enabled 424, then the selected feature can be controlled by the FZC as well as the RZMC. Next, the process returns to determining 418 whether the FZC feature enablement/disablement subsystem selection is desired.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An occupant communication system in a vehicle comprising:
    a rear zone master controller that controls a plurality of selected vehicle subsystems within the occupant communication system;
    a front zone controller in electrical communication with the rear zone master controller that is controlled by the rear zone master controller; and
    a communications module in operative communication with the rear zone master controller and the front zone controller, wherein the rear zone master controller, the front zone controller, and the communications module are in operative communication with one another and with a vehicle communications network via the communications module to control the plurality of selected vehicle subsystems, wherein the rear zone master controller enables, disables, or limits control of the front zone controller via the communications module.

2. The occupant communication system of claim 1 wherein the rear zone master controller is located in one or more rows defined as a rear zone behind a front row of the vehicle defined as a front zone so that the rear zone master controller is accessible by a rear zone occupant also located in the rear zone, and wherein the rear zone master controller is controlled by the rear zone occupant; and
    wherein the front zone controller is located in the front zone of the vehicle so that the front zone controller is accessible by a driver and at least one front zone occupant in the vehicle.

3. The occupant communication system of claim 2 comprising:
    at least one occupant communication device that is paired with the front zone controller if the occupant communication device is located in the front zone, and that is authenticated and paired with the rear zone master controller if the occupant communication device is located in the rear zone.

4. The occupant communication system of claim 2 wherein the front zone controller controls the plurality of subsystems that collectively define operation of a plurality of vehicle features when the rear zone master controller is not enabled and controls none, all, or some of the plurality of vehicle features as determined by selection of an occupant communications system control mode by the rear zone occupant when the rear zone master controller is enabled.

5. The occupant communication system of claim 4 wherein when the rear zone master controller is enabled and the occupant communications system operates in a rear zone occupant only control mode the rear zone master controller controls one or more of the vehicle features that are selected by the rear zone occupant and overrides all functionality of the front zone controller.

6. The occupant communication system of claim 4 wherein when the rear zone master controller is enabled and the occupant communications system operates in a full dual control mode the rear zone master controller controls one or more of the plurality of vehicle features that are selected by the rear zone occupant but the rear zone master controller does not control of any of a plurality of features related to the basic operation of a moving vehicle; and
    the front zone controller also controls one or more of the of the plurality of vehicle features that are selected by the front zone occupant and controls the plurality of features related to the basic operation of the moving vehicle.

7. The occupant communication system of claim 4 wherein when the rear zone master controller is enabled and the occupant communications system operates in a driver related features only control mode the rear zone master controller controls one or more of the plurality of vehicle features selected by the rear zone occupant but does not maintain control of any of a plurality of features related to the basic operation of a moving vehicle and disables control the front zone controller has over the plurality of vehicle features except for control the front zone controller has over the plurality of features related to operation of the moving vehicle.

8. The occupant communication system of claim 4 wherein when the rear zone master controller is enabled and the occupant communications system is operating in a rear zone occupant selection of front zone controller features control mode the rear zone master controller controls one or more of the plurality of vehicle features selected by the rear zone occupant but does not control any of a plurality of features related to the basic operation of a moving vehicle; and
    the rear zone occupant selectively disables or enables the front zone controller to enable or disable the front zone controller's control over one or more of the selected vehicle features.

9. The occupant communication system of claim 1 wherein the plurality of vehicle subsystems comprise at least one of the following an infotainment system; a hands-free subsystem; a climate control system; a seat control system; a front zone display system enabled by a rear zone occupant to display features selected by the front zone controller; a navigation system that is monitored by the rear zone master controller and is controlled by either the front zone controller or the rear zone master controller; and a front zone feature selection system enabled by a rear zone occupant to selectively enable or disable vehicle features from being displayed or controlled by the front zone controller, wherein each of the vehicle subsystems are controlled by the rear zone occupant when the rear zone master controller is enabled.

10. An occupant communication system in a vehicle comprising:
   a rear zone master controller that controls a plurality of selected vehicle subsystems within the occupant communication system;
   a front zone controller in electrical communication with the rear zone master controller that is controlled by the rear zone master controller; and
   a communications module in operative communication with the rear zone master controller and the front zone controller, wherein the rear zone master controller, the front zone controller, and the communications module are in operative communication with one another and with a vehicle communications network via the communications module to control the plurality of selected vehicle subsystems, wherein the rear zone master controller enables, disables, or limits control of the front zone controller via the communications module;
   wherein the rear zone master controller is located in one or more rows defined as a rear zone behind a front row of the vehicle defined as a front zone so that the rear zone master controller is accessible by a rear zone occupant also located in the rear zone, and wherein the rear zone master controller is controlled by the rear zone occupant;
   wherein the front zone controller is located in the front zone of the vehicle so that the front zone controller is accessible by a driver and at least one front zone occupant in the vehicle;
   wherein the rear zone master controller includes a rear zone master controller function controller that controls a plurality of functions of the rear zone master controller and a rear zone master controller display that provides an interface for the rear zone occupant to use the rear zone master controller;
   the front zone controller includes a front zone controller function controller that controls a plurality of functions of the front zone controller and a front zone controller display that provides an interface for the front zone occupant to use the front zone controller; and
   the occupant communications system is enabled to operate in a privacy mode that prevents the front zone controller function controller from monitoring and the front zone controller display from displaying any selections made by the rear zone occupant on the rear zone master controller display.

11. A method of controlling an occupant communication system in a vehicle comprising:
   controlling a plurality of selected vehicle subsystems that define operation of a plurality of vehicle features within the occupant communication system with a rear zone master controller;
   locating the rear zone master controller in one or more rows defined as a rear zone behind a front row of the vehicle defined as a front zone so that the rear zone master controller is accessible by the rear zone occupant also located in the rear zone to select one or more of the plurality of vehicle features;
   using the rear zone master controller to control a front zone controller in electrical communication with the rear zone master controller;
   locating the front zone controller in the front zone so that the front zone controller is accessible by a driver and at least one front zone occupant in a vehicle; and
   providing a communications module in operative communication with the rear zone master controller and the front zone controller, wherein the rear zone master controller, the front zone controller, and the communications module are in operative communication with one another and with a vehicle communications network via the communications module to control the plurality of selected vehicle subsystems.

12. The method of controlling an occupant communication system of claim 11 further comprising:
   authenticating the rear zone occupant with the rear zone master controller to enable the rear zone occupant to control the occupant communications system.

13. The method of controlling an occupant communication system of claim 11 further comprising:
   pairing at least one occupant communication device with the front zone controller when the occupant communication device is located in the front zone, and
   authenticating and pairing at least one occupant communication device with the rear zone master controller when the occupant communication device is located in the rear zone.

14. The method of controlling an occupant communication system of claim 11 further comprising:
   selecting an occupant communications system control mode selected from a rear zone occupant only control mode, a full dual control mode, a driver related features only control mode, or a rear zone occupant selection of front zone controller features control mode to enable the rear zone master controller to control none, all, or some of the plurality of vehicle features that are selected by the rear zone occupant; and
   using the rear zone master controller to enable, disable, or limit control of the front zone controller based on the selected occupant communications system control mode.

15. The method of controlling an occupant communication system of claim 14 further comprising:
   selecting a rear zone occupant only control mode to enable the rear zone master controller to control one or more of the plurality of vehicle features selected by the rear zone occupant; and
   overriding all functionality of the front zone controller when the occupant communications system operates in the rear zone occupant control mode.

16. The method of controlling an occupant communication system of claim 14 further comprising:
   selecting a full dual control mode to enable the rear zone master controller to control of the plurality of vehicle features selected by the rear zone occupant and to prevent the RMZC to control any of a plurality of features related to the basic operation of a moving vehicle;
   enabling the front zone controller to also control the plurality of vehicle features that are selected by the front zone occupant and to control the plurality of features related to the basic operation of the moving vehicle when the occupant communications system operates in the full dual control mode.

17. The method of controlling an occupant communication system of claim 14 further comprising:
- selecting a driver related features only control mode to enable the rear zone master controller to control one or more of the plurality of vehicle features selected by the rear zone occupant;
- preventing the rear zone master controller from controlling of any a plurality of features related to the basic operation of a moving vehicle when the occupant communications system operates in the driver related features only control mode; and
- disabling control the front zone controller has over all of the plurality of vehicle features except for control over the plurality of features related to operation of the moving vehicle when the occupant communications system operates in the driver related features only control mode.

18. The method of controlling an occupant communication system of claim 14 further comprising:
- selecting a rear zone occupant selection of front zone controller features control mode to enable the rear zone master controller to control one or more of the plurality of vehicle features that are selected by the rear zone occupant;
- preventing the rear zone master controller from controlling of any of the plurality of features related to the basic operation of a moving vehicle when the occupant communications system operates in the rear zone occupant selection of front zone controller features control mode; and
- selectively disabling or enabling the front zone controller to enable or disable control over one or more of the plurality of vehicle features selected by the rear zone occupant.

19. The method of controlling an occupant communication system of claim 14 further comprising:
- controlling one of the plurality of vehicle subsystems to control: an infotainment system; a hands-free subsystem; a climate control system; a seat control system; a front zone display system enabled by a rear zone occupant to display features selected by the front zone controller; a navigation system monitored by the rear zone master controller and that is controlled by either the front zone controller or the rear zone master controller; and a front zone feature selection system enabled by a rear zone occupant to selectively enable or disable vehicle features from being displayed or controlled by the front zone controller, wherein each of the vehicle subsystems are controlled by the rear zone occupant when the rear zone master controller is enabled.

20. A method of controlling an occupant communication system in a vehicle comprising:
- controlling a plurality of selected vehicle subsystems that define operation of a plurality of vehicle features within the occupant communication system with a rear zone master controller;
- locating the rear zone master controller in one or more rows defined as a rear zone behind a front row of the vehicle defined as a front zone so that the rear zone master controller is accessible by the rear zone occupant also located in the rear zone to select one or more of the plurality of vehicle features;
- using the rear zone master controller to control a front zone controller in electrical communication with the rear zone master controller;
- locating the front zone controller in the front zone so that the front zone controller is accessible by a driver and at least one front zone occupant in a vehicle; and
- providing a communications module in operative communication with the rear zone master controller and the front zone controller, wherein the rear zone master controller, the front zone controller, and the communications module are in operative communication with one another and with a vehicle communications network via the communications module to control the plurality of selected vehicle subsystems; and
- operating in a privacy mode that prevents the front zone controller from monitoring and displaying any selections made by the rear zone occupant of on a front zone controller display.

* * * * *